United States Patent
Berger

(10) Patent No.: US 9,454,678 B2
(45) Date of Patent: Sep. 27, 2016

(54) ALWAYS-AVAILABLE EMBEDDED THEFT REACTION SUBSYSTEM

(75) Inventor: Michael Berger, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 20 days.

(21) Appl. No.: 13/993,051

(22) PCT Filed: Dec. 22, 2011

(86) PCT No.: PCT/US2011/067059
§ 371 (c)(1),
(2), (4) Date: Jun. 10, 2013

(87) PCT Pub. No.: WO2013/095589
PCT Pub. Date: Jun. 27, 2013

(65) Prior Publication Data
US 2014/0208447 A1    Jul. 24, 2014

(51) Int. Cl.
G06F 21/88        (2013.01)
G06F 21/55        (2013.01)
G06F 21/57        (2013.01)
G06F 21/81        (2013.01)
H04W 12/12        (2009.01)

(52) U.S. Cl.
CPC ............ *G06F 21/88* (2013.01); *G06F 21/554* (2013.01); *G06F 21/575* (2013.01); *G06F 21/81* (2013.01); *H04W 12/12* (2013.01); *G06F 2221/2143* (2013.01)

(58) Field of Classification Search
None
See application file for complete search history.

(56) References Cited

U.S. PATENT DOCUMENTS

| 4,471,343 | A | | 9/1984 | Lemelson |
| 5,052,198 | A | | 10/1991 | Watts |
| 5,189,400 | A | | 2/1993 | Schultz |
| 5,406,261 | A | | 4/1995 | Glenn |
| 5,748,084 | A | * | 5/1998 | Isikoff ..................... 340/568.1 |
| 5,757,271 | A | | 5/1998 | Andrews |
| 5,760,690 | A | | 6/1998 | French |

(Continued)

FOREIGN PATENT DOCUMENTS

| CN | 101136124 A | 3/2008 |
| CN | 201066914 | 5/2008 |

(Continued)

OTHER PUBLICATIONS

Notification of Transmittal of the International Search Report and the Written Opinion or the International Searching Authority, or the Declaration for PCT Counterpart Application No. PCT/US2011/067051, 9 pgs., (Aug. 22, 2012).

(Continued)

*Primary Examiner* — Christopher Revak
(74) *Attorney, Agent, or Firm* — Nicholson De Vos Webster & Elliott, LLP

(57) ABSTRACT

A platform protected by a system, the platform including a power source, is described. The system in one embodiment comprises a risk behavior logic to detect a potential problem, a core logic component to provide logic to analyze the potential problem and to trigger a security action logic to perform a security action, when the potential problem indicates a theft suspicion, and the security action logic to utilize a kill pill to disable the platform, when the platform has set a high security status authorizing use of a self-kill pill or the platform sends an alert and receives a remote instruction to utilize a remote kill pill.

20 Claims, 33 Drawing Sheets

(56) References Cited

U.S. PATENT DOCUMENTS

| | | | |
|---|---|---|---|
| 5,963,131 A | 10/1999 | D'Angelo et al. | |
| 5,970,227 A | 10/1999 | Dayan et al. | |
| 6,028,505 A | 2/2000 | Drori | |
| 6,046,571 A | 4/2000 | Bovio et al. | |
| 6,087,937 A * | 7/2000 | McCarthy | G06F 21/88 340/12.54 |
| 6,133,830 A | 10/2000 | D'Angelo et al. | |
| 6,351,817 B1 | 2/2002 | Flyntz | |
| 6,362,736 B1 | 3/2002 | Gehlot | |
| 6,389,542 B1 | 5/2002 | Flyntz | |
| 6,434,400 B1 | 8/2002 | Villevieille et al. | |
| 6,462,648 B1 | 10/2002 | Stouffer et al. | |
| 6,507,914 B1 * | 1/2003 | Cain et al. | 726/35 |
| 6,643,781 B1 * | 11/2003 | Merriam | 726/35 |
| 6,721,738 B2 | 4/2004 | Verplaetse et al. | |
| 6,970,095 B1 | 11/2005 | Lee et al. | |
| 7,210,045 B2 | 4/2007 | Dunstan | |
| 7,421,589 B2 | 9/2008 | Williams et al. | |
| 7,463,861 B2 | 12/2008 | Eisenbach | |
| 7,567,176 B2 | 7/2009 | Stephens | |
| 7,603,435 B2 | 10/2009 | Welingkar et al. | |
| 7,715,819 B2 | 5/2010 | Rockwell | |
| 7,786,861 B2 | 8/2010 | Howarth et al. | |
| 7,986,939 B2 | 7/2011 | Brown et al. | |
| 8,012,219 B2 * | 9/2011 | Mendez et al. | 726/35 |
| 8,206,460 B2 | 6/2012 | Posamentier | |
| 8,317,878 B2 * | 11/2012 | Chhabra et al. | 726/35 |
| 8,370,168 B1 | 2/2013 | Jenkins et al. | |
| 8,407,759 B1 | 3/2013 | Sotos et al. | |
| 8,417,217 B2 | 4/2013 | Kasama | |
| 8,429,759 B2 * | 4/2013 | Adrangi | 726/34 |
| 8,438,377 B2 | 5/2013 | Senda | |
| 8,467,770 B1 | 6/2013 | Ben Ayed | |
| 8,542,833 B2 * | 9/2013 | Devol et al. | 380/259 |
| 8,551,186 B1 | 10/2013 | Strand | |
| 8,555,083 B1 | 10/2013 | Nanda et al. | |
| 8,566,610 B2 * | 10/2013 | Hazra | G06F 21/88 380/28 |
| 8,696,765 B2 * | 4/2014 | Mendez et al. | 726/35 |
| 9,092,957 B2 | 7/2015 | Berger | |
| 2002/0138445 A1 | 9/2002 | Laage et al. | |
| 2003/0074577 A1 | 4/2003 | Bean et al. | |
| 2003/0074590 A1 | 4/2003 | Fogle et al. | |
| 2003/0160692 A1 | 8/2003 | Nonaka | |
| 2004/0066302 A1 | 4/2004 | Menard et al. | |
| 2004/0143750 A1 | 7/2004 | Kulack et al. | |
| 2004/0155777 A1 | 8/2004 | Mitchell et al. | |
| 2004/0203601 A1 | 10/2004 | Morriss et al. | |
| 2005/0044433 A1 | 2/2005 | Dunstan | |
| 2005/0046580 A1 | 3/2005 | Miranda-Knapp | |
| 2005/0170811 A1 | 8/2005 | Pelaez et al. | |
| 2005/0174238 A1 | 8/2005 | Foseide | |
| 2005/0193144 A1 | 9/2005 | Hassan et al. | |
| 2005/0197744 A1 | 9/2005 | Kalau et al. | |
| 2005/0237185 A1 | 10/2005 | Brown et al. | |
| 2006/0085864 A1 | 4/2006 | Chang | |
| 2006/0103531 A1 | 5/2006 | Chevreau et al. | |
| 2006/0131958 A1 | 6/2006 | Brooks | |
| 2006/0192653 A1 | 8/2006 | Atkinson et al. | |
| 2007/0005987 A1 | 1/2007 | Durham et al. | |
| 2007/0030149 A1 | 2/2007 | Hoerner | |
| 2007/0124804 A1 | 5/2007 | Burnham et al. | |
| 2007/0277230 A1 | 11/2007 | Hawkins et al. | |
| 2007/0283447 A1 | 12/2007 | Hong et al. | |
| 2008/0046753 A1 | 2/2008 | Fusari | |
| 2008/0055040 A1 | 3/2008 | Lizza et al. | |
| 2008/0060086 A1 | 3/2008 | Bhansali et al. | |
| 2008/0061929 A1 | 3/2008 | Cromer et al. | |
| 2008/0072284 A1 | 3/2008 | Horvitz et al. | |
| 2008/0079576 A1 | 4/2008 | Adapathya et al. | |
| 2008/0106366 A1 | 5/2008 | Zhang et al. | |
| 2008/0107274 A1 | 5/2008 | Worthy | |
| 2008/0115226 A1 | 5/2008 | Welingkar et al. | |
| 2008/0141052 A1 | 6/2008 | Thelemann | |
| 2008/0141382 A1 | 6/2008 | Jonas | |
| 2008/0184360 A1 | 7/2008 | Kornilovsky et al. | |
| 2008/0186162 A1 | 8/2008 | Rajan et al. | |
| 2008/0266089 A1 | 10/2008 | Haren et al. | |
| 2009/0006867 A1 | 1/2009 | Choyi et al. | |
| 2009/0015372 A1 | 1/2009 | Kady | |
| 2009/0089887 A1 * | 4/2009 | Aissi | G06F 21/88 726/35 |
| 2009/0106563 A1 | 4/2009 | Cherpantier | |
| 2009/0144557 A1 | 6/2009 | Sutton | |
| 2009/0183245 A1 | 7/2009 | Simpson et al. | |
| 2009/0207013 A1 | 8/2009 | Ayed | |
| 2009/0228992 A1 * | 9/2009 | Ca | G06F 21/88 726/35 |
| 2009/0243837 A1 | 10/2009 | Chul Lee et al. | |
| 2009/0249497 A1 | 10/2009 | Fitzgerald et al. | |
| 2009/0253410 A1 | 10/2009 | Fitzgerald et al. | |
| 2009/0265775 A1 | 10/2009 | Wisely et al. | |
| 2009/0271877 A1 | 10/2009 | Bradley | |
| 2010/0037312 A1 | 2/2010 | Tarkhanyan et al. | |
| 2010/0058066 A1 | 3/2010 | Wang | |
| 2010/0083387 A1 | 4/2010 | Rodgers et al. | |
| 2010/0090831 A1 | 4/2010 | Zhao et al. | |
| 2010/0100972 A1 * | 4/2010 | Lemieux | G06F 21/57 726/34 |
| 2010/0120406 A1 | 5/2010 | Banga et al. | |
| 2010/0141425 A1 | 6/2010 | Tracey et al. | |
| 2010/0169949 A1 | 7/2010 | Rothman et al. | |
| 2010/0169979 A1 | 7/2010 | Brown et al. | |
| 2010/0210240 A1 | 8/2010 | Mahaffey et al. | |
| 2010/0218012 A1 | 8/2010 | Joseph et al. | |
| 2010/0251391 A1 * | 9/2010 | Adrangi | H04W 12/12 726/34 |
| 2010/0268967 A1 | 10/2010 | Senda | |
| 2010/0287385 A1 | 11/2010 | Conte et al. | |
| 2010/0328069 A1 | 12/2010 | Bouchard et al. | |
| 2011/0055891 A1 | 3/2011 | Rice | |
| 2011/0134841 A1 | 6/2011 | Shaheen | |
| 2011/0141276 A1 | 6/2011 | Borghei | |
| 2011/0154030 A1 | 6/2011 | Hazra et al. | |
| 2011/0154478 A1 | 6/2011 | Chew | |
| 2011/0159850 A1 | 6/2011 | Faith et al. | |
| 2011/0195665 A1 | 8/2011 | Friedlaender | |
| 2011/0215921 A1 | 9/2011 | Ben Ayed et al. | |
| 2011/0215927 A1 | 9/2011 | Chao et al. | |
| 2011/0225642 A1 | 9/2011 | Gopalakrishna | |
| 2011/0305337 A1 | 12/2011 | Devol et al. | |
| 2011/0313922 A1 | 12/2011 | Ben Ayed | |
| 2012/0017095 A1 | 1/2012 | Blenkhorn et al. | |
| 2012/0084448 A1 | 4/2012 | Yamaguchi | |
| 2012/0133484 A1 | 5/2012 | Griffin | |
| 2012/0185933 A1 | 7/2012 | Belk et al. | |
| 2012/0196529 A1 | 8/2012 | Huomo et al. | |
| 2012/0282886 A1 | 11/2012 | Amis | |
| 2012/0291103 A1 | 11/2012 | Cohen | |
| 2013/0031621 A1 | 1/2013 | Jenne et al. | |
| 2013/0275770 A1 | 10/2013 | Berger | |
| 2014/0007264 A1 | 1/2014 | Berger | |
| 2014/0013454 A1 | 1/2014 | Berger et al. | |
| 2014/0013455 A1 | 1/2014 | Berger et al. | |
| 2014/0020121 A1 | 1/2014 | Berger et al. | |
| 2014/0020122 A1 | 1/2014 | Berger | |
| 2014/0020123 A1 | 1/2014 | Berger et al. | |
| 2014/0055265 A1 | 2/2014 | Berger | |
| 2014/0123328 A1 | 5/2014 | Berger | |
| 2014/0162598 A1 | 6/2014 | Villa-Real | |
| 2014/0208447 A1 | 7/2014 | Berger | |
| 2014/0223586 A1 | 8/2014 | Berger et al. | |
| 2014/0230057 A1 | 8/2014 | Berger | |

FOREIGN PATENT DOCUMENTS

| | | |
|---|---|---|
| CN | 101888629 A | 11/2010 |
| EP | 350325 A2 | 7/1989 |
| EP | 2 207 123 A2 | 7/2010 |
| EP | 2207123 A2 | 7/2010 |
| GB | 2356477 A | 5/2001 |
| JP | 2006309532 A | 11/2006 |
| JP | 2008199221 A | 8/2008 |
| JP | 2010-191946 A | 9/2010 |

(56) References Cited

FOREIGN PATENT DOCUMENTS

| | | |
|---|---|---|
| JP | 2010191946 A | 9/2010 |
| TW | I65642 | 8/1991 |
| TW | 468939 | 12/2001 |
| TW | 200528979 A | 9/2005 |
| TW | 200921452 A | 5/2009 |
| TW | 201028883 A | 8/2010 |
| TW | 201038039 A1 | 10/2010 |
| TW | M399367 U | 3/2011 |
| TW | M416829 U | 11/2011 |
| TW | I474214 B | 2/2015 |
| WO | 2007107749 A1 | 9/2007 |
| WO | 2010052669 A1 | 5/2010 |
| WO | 2013095583 A1 | 6/2013 |
| WO | 2013095584 A1 | 6/2013 |
| WO | 2013095585 A1 | 6/2013 |
| WO | 2013095586 A1 | 6/2013 |
| WO | 2013095587 A1 | 6/2013 |
| WO | 2013095588 A1 | 6/2013 |
| WO | 2013095589 A1 | 6/2013 |
| WO | 2013095590 A1 | 6/2013 |

OTHER PUBLICATIONS

PCT Notification concerning Transmittal of International Preliminary Report on Patentability (Chapter I of the Patent Cooperation Treaty) for PCT Counterpart Application No. PCT/US2011/067051, 5 pgs., (Jun. 24, 2014).

Notification of Transmittal of the International Search Report and the Written Opinion or the International Searching Authority, or the Declaration for PCT Counterpart Application No. PCT/US2011/067052, 9 pgs., (Aug. 27, 2012).

PCT Notification concerning Transmittal of International Preliminary Report on Patentability (Chapter I of the Patent Cooperation Treaty) for PCT Counterpart Application No. PCT/US2011/067052, 5 pgs., (Jun. 24, 2014).

Notification of Transmittal of the International Search Report and the Written Opinion or the International Searching Authority, or the Declaration for PCT Counterpart Application No. PCT/US2011/067053, 9 pgs., (Aug. 3, 2012).

PCT Notification concerning Transmittal of International Preliminary Report on Patentability (Chapter I of the Patent Cooperation Treaty) for PCT Counterpart Application No. PCT/US2011/067053, 5 pgs., (Jun. 24, 2014).

Notification of Transmittal of the International Search Report and the Written Opinion or the International Searching Authority, or the Declaration for PCT Counterpart Application No. PCT/US2011/067054, 9 pgs., (May 7, 2012).

PCT Notification concerning Transmittal of International Preliminary Report on Patentability (Chapter I of the Patent Cooperation Treaty) for PCT Counterpart Application No. PCT/US2011/067054, 5 pgs., (Jun. 24, 2014).

Notification of Transmittal of the International Search Report and the Written Opinion or the International Searching Authority, or the Declaration for PCT Counterpart Application No. PCT/US2011/067056, 11 pgs., (May 7, 2012).

PCT Notification concerning Transmittal of International Preliminary Report on Patentability (Chapter I of the Patent Cooperation Treaty) for PCT Counterpart Application No. PCT/US2011/067056, 5 pgs., (Jun. 24, 2014).

Notification of Transmittal of the International Search Report and the Written Opinion or the International Searching Authority, or the Declaration for PCT Counterpart Application No. PCT/US2011/067057, 9 pgs., (Aug. 24, 2012).

PCT Notification concerning Transmittal of International Preliminary Report on Patentability (Chapter I of the Patent Cooperation Treaty) for PCT Counterpart Application No. PCT/US2011/067057, 5 pgs., (Jun. 24, 2014).

Notification of Transmittal of the International Search Report and the Written Opinion or the International Searching Authority, or the Declaration for PCT Counterpart Application No. PCT/US2011/067059, 10 pgs., (Jul. 27, 2012).

PCT Notification concerning Transmittal of International Preliminary Report on Patentability (Chapter I of the Patent Cooperation Treaty) for PCT Counterpart Application No. PCT/US2011/067059, 6 pgs., (Jun. 24, 2014).

Notification of Transmittal of the International Search Report and the Written Opinion or the International Searching Authority, or the Declaration for PCT Counterpart Application No. PCT/US2011/067060, 12 pgs., (Sep. 18, 2012).

PCT Notification concerning Transmittal of International Preliminary Report on Patentability (Chapter I of the Patent Cooperation Treaty) for PCT Counterpart Application No. PCT/US2011/067060, 7 pgs., (Jun. 24, 2014).

Notification of Transmittal of the International Search Report and the Written Opinion or the International Searching Authority, or the Declaration for PCT Counterpart Application No. PCT/US2011/067061, 10 pgs., (Sep. 17, 2012).

PCT Notification concerning Transmittal of International Preliminary Report on Patentability (Chapter I of the Patent Cooperation Treaty) for PCT Counterpart Application No. PCT/US2011/067061, 6 pgs., (Jun. 24, 2014).

Notification of Transmittal of the International Search Report and the Written Opinion or the International Searching Authority, or the Declaration for PCT Counterpart Application No. PCT/US2011/067063, 11 pgs., (Sep. 17, 2012).

PCT Notification concerning Transmittal of International Preliminary Report on Patentability (Chapter I of the Patent Cooperation Treaty) for PCT Counterpart Application No. PCT/US2011/067063, 6 pgs., (Jun. 24, 2014).

Notification of Transmittal of the International Search Report and the Written Opinion or the International Searching Authority, or the Declaration for PCT Counterpart Application No. PCT/US2011/067064, 10 pgs., (Jul. 27, 2012).

PCT Notification concerning Transmittal of International Preliminary Report on Patentability (Chapter I of the Patent Cooperation Treaty) for PCT Counterpart Application No. PCT/US2011/067064, 6 pgs., (Jun. 24, 2014).

Notification of Transmittal of the International Search Report and the Written Opinion or the International Searching Authority, or the Declaration for PCT Counterpart Application No. PCT/US2011/067065, 10 pgs., (Aug. 3, 2012).

PCT Notification concerning Transmittal of International Preliminary Report on Patentability (Chapter I of the Patent Cooperation Treaty) for PCT Counterpart Application No. PCT/US2011/067065, 6 pgs., (Jun. 24, 2014).

Notification of Transmittal of the International Search Report and the Written Opinion or the International Searching Authority, or the Declaration for PCT Counterpart Application No. PCT/US2011/067066, 8 pgs., (Jul. 18, 2012).

PCT Notification concerning Transmittal of International Preliminary Report on Patentability (Chapter I of the Patent Cooperation Treaty) for PCT Counterpart Application No. PCT/US2011/067066, 5 pgs., (Jun. 24, 2014).

Japanese Application No. 2013-551974, Notice of Reasons for Rejection, 4 pgs. (Jul. 1, 2014).

Extended European Search Report from European Patent Application No. 11878212.7, mailed Aug. 5, 2015, 7 pages.

Office action with Search Report from Taiwan Patent Application No. 101146687, mailed May 8, 2015, 13 pages.

Office action from U.S. Appl. No. 13/992,238, mailed Dec. 8, 2014, 20 pages.

Final Office action from U.S. Appl. No. 13/992,238, mailed May 20, 2015, 15 pages.

Extended European Search Report from European Patent Application No. 11877652.5, mailed Jul. 9, 2015, 7 pages.

Notice of Allowance and Search Report with English translation of Search Report from Taiwan Patent Application No. 101146191, mailed Aug. 25, 2014, 5 pages.

Office action from U.S. Appl. No. 13/992,480, mailed Mar. 31, 2015, 17 pages.

Extended European Search Report from European Patent Application No. 11878252.3, mailed Aug. 8, 2015, 6 pages.

(56) References Cited

OTHER PUBLICATIONS

Office action and Search Report with summarize English Translation from Taiwan Patent Application No. 101144321, mailed Apr. 28, 2015, 11 pages.
Office Action from U.S. Appl. No. 13/992,705, mailed Nov. 4, 2014, 22 pages.
Final Office Action from U.S. Appl. No. 13/992,705, mailed Apr. 9, 2015, 14 pages.
Extended European Search Report from European Patent Application No. 1187798.2, mailed Aug. 5, 2015, 7 pages.
Office action and Search Report with English translation from Taiwan Patent Application 101144506, mailed Dec. 12, 2014, 15 pages.
Office Action with English translation from Taiwan Patent Application 101144506, mailed Aug. 25, 2015, 10 pages.
Office Action from U.S. Appl. No. 13/992,725, mailed Oct. 27, 2014, 18 pages.
Office Action from U.S. Appl. No. 13/922,725, mailed Apr. 7, 2015, 21 pages.
Extended European Search Report from European Patent Application No. 11878149.1, mailed Aug. 5, 2015, 5 pages.
Notice of Allowance and Search Report with English translation for Taiwan Patent Application No. 101146693, mailed Oct. 22, 2014, 4 pages.
Office action from U.S. Appl. No. 13/992,690, mailed Nov. 20, 2014, 15 pages.
Final Office Action from U.S. Appl. No. 13/992,690, mailed Jun. 18, 2015, 15 pages.
Office Action and Search Report with English translation from Taiwan Patent Application No. 101146192, mailed Dec. 2, 2014, 14 pages.
Office Action from U.S. Appl. No. 13/993,435, mailed May 11, 2015, 13 pages.
Final Office action from U.S. Appl. No. 13/993,435, mailed Aug. 25, 2015, 11 pages.
Extended European Search Report from European Patent Application No. 11878026.1, mailed Aug. 5, 2015, 6 pages.
Office action and Search Report with English translation from Taiwan Patent Application No. 101144320, mailed Jun. 29, 2015, 8 pages.
Office action and Search Report with English translation from Taiwan Patent Application No. 101144320, mailed Nov. 11, 2014, 9 pages.
Office action from U.S. Appl. No. 13/993,051, mailed Oct. 22, 2014, 13 pages.
Final Office action from U.S. Appl. No. 13/993,051, mailed May 6, 2015, 8 pages.
Extended European Search Report from European Patent Application No. 11877647.5, mailed Aug. 5, 2015, 6 pages.
PCT/US2011/067053 Notification of Transmittal of the International Search Report and the Written Opinion of the International Searching Authority, mailed Aug. 3, 2012, 9 pages.
PCT/US2011/067053 Notification Concerning Transmittal of International Prelimanry Report on Patentability, mailed Jul. 3, 2014, 6 pages.
PCT/US2011/067054 Notification of Transmittal of the International Search Report and the Written Opinion of the International Searching Authority, mailed May 7, 2012, 9 pages.
PCT/US2011/067054 Notification Concerning Transmittal of International Preliminary Report on Patentability, mailed Jul. 3, 2014, 6 pages.
PCT/US2011/067056 Notification of Transmittal of the International Search Report and the Written Opinion of the International Searching Authority, mailed May 7, 2012, 9 pages.
PCT/US2011/067056 Notification Concerning Transmittal of International Preliminary Report on Patentability, mailed Jul. 3, 2014, 6 pages.
PCT/US2011/067057 Notification of Transmittal of the Interantional Search Report and the Written Opinion of the International Serching Authority, mailed Aug. 24, 2012, 9 pages.
PCT/US2011/067057 Notification Concerning Transmittal of International Preliminary Report on Patentability, mailed Jul. 3, 2014, 6 pages.
PCT/US2011/067059 Notification of Transmittal of the International Search Report and the Written Opinion of the International Searching Authority, mailed Jul. 27, 2012, 10 pages.
PCT/US2011/067059 Notification Concerning Transmittal of International Preliminary Report on Patentability, mailed Jul. 3, 2014, 7 pages.
PCT/US2011/067060 Notification of Transmittal of the International Search Report and the Written Opinion of the International Searching Authority, mailed Sep. 18, 2012 11 pages.
PCT/US2011/067060 Notification Concerning Transmittal of International Preliminary Report on Patentability, mailed Jul. 3, 2014, 8 pages.
PCT/US2011/067061 Notification of Transmittal of the International Search Report and the Written Opinion of the International Seraching Authority, mailed Sep. 17, 2012, 10 pages.
PCT/US2011/067061 Notification Concerning Transmittal of International Preliminary Report on Patentability, mailed Jul. 3, 2014, 7 pages.
PCT/US2011/067063 Notification of Transmittal of the International Search Report and the Written Opinion of the International Searching Authority, mailed Sep. 17, 2012, 10 pages.
PCT/US2011/067063 Notification Concerning Transmittal of International Preliminary Report on Patentability, mailed Jul. 3, 2014, 7 pages.
PCT/US2011/067064 Notification of Transmittal of the International Search Report and the Written Opinion of the International Searching Authority, mailed Jul. 27, 2012, 10 pages.
PCT/US2011/067064 Notification Concerning Transmittal of International Preliminary Report on Patentability, mailed Jul. 3, 2014, 7 pages.
PCT/US2011/07065 Notification of Transmittal of the International Search Report and the Written Opinion of the International Searching Authority, mailed Aug. 3, 2012, 10 pages.
PCT/US2011/067065 Notification Concerning Transmittal of International Preliminary Report on Patentability, mailed Jul. 3, 2014, 7 pages.
PCT/US2011/067066 Notification of Transmittal of the International Search Report and the Written Opinion of the International Searching Authority, mailed Jul. 18, 2012, 8 pages.
PCT/US2011/067066 Notification concerning transmittal of International Preliminary Report on Patentability, mailed Jul. 3, 2014, 6 pages.
Office action and Search Report with English translation from Taiwan Patent Application No. 101144509, mailed Dec. 12, 2014, 17 pages.
Notice of Allowance from Taiwan Patent Application No. 101144509, mailed Aug. 25, 2015, 2 pages.
Office Action form U.S. Appl. No. 13/993,055, mailed Oct. 21, 2014, 13 pages.
Fianl Office action from U.S. Appl. No. 13/993,055, mailed May 7, 2015, 9 pages.
Office action and Search Report with summarized English translation from Taiwan Patent Application No. 101146684, mailed Oct. 21, 2014, 10 pages.
Office action with English translation from Taiwan Patent Application No. 101146684, mailed Jun. 29, 2015, 8 pages.
Office action from U.S. Appl. No. 13/992,413, mailed Sep. 30, 2014, 12 pages.
Final Office action from U.S. Appl. No. 13/992,413, mailed Feb. 18, 2015, 7 pages.
Office action from U.S. Appl. No. 13/992,413, mailed Jun. 11, 2015, 7 pages.
Extended European Search Report from European Patent Application No. 11877982.6, mailed Aug. 5, 2015, 6 pages.
Office action and Search Report with English translation from Taiwan Patent Application No. 101146185, mailed Dec. 22, 2014, 14 pages.
Office action from U.S. Appl. No. 13/993,536, mailed Dec. 3, 2014, 15 pages.

(56) References Cited

OTHER PUBLICATIONS

Partial Supplementary European Search Report from European Patent Application No. 11877890.1, mailed Aug. 12, 2015, 6 pages.
Office action and Search Report with summarized English translation from Taiwan Patent Application No. 101144319, mailed Dec. 9, 2014, 9 pages.
Notice Of Allowance from Taiwan Patent Application No. 101144319, mailed Jul. 27, 2015, 2 pages.
Notice of Allowance from U.S. Appl. No. 13/993,536, mailed Mar. 19, 2015, 8 pages.
Office action from U.S. Appl. No. 13/991,888, mailed Jan. 8, 2015, 21 pages.
Final Office Action from U.S. Appl. No. 13/991,888, mailed Jun. 15, 2015, 14 pages.
Extended European Search Report from European Patent Application No. 11877701.0, mailed Aug. 5, 2015, 6 pages.
Office action and Search Report with English translation from Taiwan Patent Application No. 101144508, mailed Oct. 17, 2014, 13 pages.
Notice of allowance from Taiwan Patent Application No. 101144508, mailed Jun. 26, 2015, 2 pages.
Office Action from U.S. Appl. No. 13/993,048, mailed Sep. 25, 2014, 10 pages.
Notice of Allowance from U.S. Appl. No. 13/993,048, mailed Apr. 3, 2015, 12 pages.
Notice of Allowance from U.S. Appl. No. 13/993,048, mailed Jul. 31, 2015, 9 pages.
Office action from U.S. Appl. No. 13/993,064, mailed Nov. 4, 2014, 23 pages.
Final Office action from U.S. Appl. No. 13/993,064, mailed Feb. 26, 2015, 19 pages.
Office action from U.S. Appl. No. 13/993,064, mailed Jul. 6, 2015, 19 pages.
Office action and Search Report with English translation from Chinese Patent Application No. 201180068132.2, mailed Jun. 12, 2015, 17 pages.
Office action with English translation from Japanese Patent Application No. 2013-551974, mailed Jul. 1, 2014, 4 pages.
Decision of Rejection with English translation from Japanese Patent Application No. 2013-551974, mailed Jan. 13, 2015, 2 pages.
Notice of Allowance from Japanese Patent Application No. 2013-551974, mailed Jun. 24, 2015, 1 page.
Notice of Final Rejection with summarized English translation from Korean Patent Application No. 2013-7020375, mailed Jul. 6, 2015, 11 pages.
Notice of Preliminary Rejection with English translation from Korean Patent Application No. 2013-7020375, mailed Jul. 21, 2014, 12 pages.
Notice of Final Rejection with English translation from Korean Patent Application No. 2013-7020375, mailed Jan. 29, 2015, 5 pages.
PCT/US2011/067051 Notification of Transmittal of the International Search Report and the Written Opinion of the International Searching Authority, mailed Aug. 22, 2012, 9 pages.
PCT/US2011/067051 Notification Concerning Transmittal of International Preliminary Report on Patentability, mailed Jul. 3, 2014.
PCT/US2011/067052 Notification of Transmittal of the International Search Report and the Written Opinion of the International Searching Authority, mailed Aug. 27, 2012, 9 pages.
PCT/US2011/067052 Notification Concerning Transmittal of International Preliminary Report on Patentability, mailed Jul. 3, 2014, 6 pages.
U.S. Appl. No. 13/992,480, mailed Aug. 7, 2015, 15 pages.
Office action and Search Report with summarized English translation from Taiwan Patent Application No. 101144321, mailed Aug. 26, 2014, 6 pages.
Office action from U.S. Appl. No. 13/993,051, mailed Sep. 25, 2015, 9 pages.
Extended European Search Report from European Patent Application No. 11877684.8, mailed Aug. 28, 2015, 5 pages.
Office action and Search Report from Taiwan Patent Application No. 101149040, mailed Mar. 17, 2015, 10 pages.
Office action from U.S. Appl. No. 13/992,705, mailed Sep. 17, 2015, 24 pages.
Final Office Action from U.S. Appl. No. 13/992,725, mailed Oct. 8, 2015, 21 pages.
Office action from U.S. Appl. No. 13/991,888, mailed Oct. 29, 2015, 17 pages.
Final Office action from U.S. Appl. No. 13/992,413, mailed Oct. 26, 2015, 7 pages.
Notice of Allowance from Taiwan Patent Application No. 101146687, mailed Nov. 26, 2015, 2 pages.
Fianl Office Action from U.S. Appl. No. 13/992,238, mailed Nov. 5, 2015, 17 pages.
Office action from U.S. Appl. No. 13/992,480, mailed Feb. 3, 2016, 14 pages.
Notice of Allowance from Taiwan Patent Application No. 101144321, mailed Nov. 27, 2015, 2 pages.
Notice of Allowance from U.S. Appl. No. 13/992,690, mailed Nov. 25, 2015, 10 pages.
Corrected Notice of Allowability from U.S. Appl. No. 13/992,690, mailed Jan. 8, 2016, 3 pages.
Notice of Allowance from Taiwan Patent Application No. 101146192, mailed Aug. 11, 2015, 2 pages.
Office Action from U.S. Appl. No. 13/993,435, mailed Dec. 31, 2015, 11 pages.
Partial Supplementary European Search Report from European Patent Application No. 11877815.8, mailed Aug. 21, 2015, 6 pages.
Extended European Search Report from European patent Application No. 11877815.8, mailed Dec. 9, 2015, 11 pages.
Office action from U.S. Appl. No. 13/993,055, mailed Nov. 30, 2015, 7 pages.
Notice of Allowance from Taiwan Patent Application No. 101146185, mailed Sep. 22, 2015, 2 pages.
Extended European Search Report from European Patent Application No. 11877890.1, mailed Dec. 1, 2015, 11 pages.
Notice of Allowance from Taiwan Patent Application No. 101149040, mailed Oct. 7, 2015, 2 pages.
Final Office action from U.S. Appl. No. 13/993,064, mailed Jan. 15, 2016, 25 pages.

\* cited by examiner

|  | MODES | | | |
| --- | --- | --- | --- | --- |
|  | Unarmed | Arming in Progress | Armed | Suspecting |
| LED | Off | Arming (blinking) | Armed (lit) | Suspecting (flashing) |
| Packets sent | Disarm (if armed) | Initial connection | Armed | Info re suspicion |
| Configuration | Unblocked | - | Blocked | Blocked |
| Transition Timer | Cancel | Cancel | Cancel | Use to transition |

Fig. 9

| Might user be Away from Platform? | Might someone be taking platform? | Platform Mode & action | Server action | User-carried device action |
|---|---|---|---|---|
| No | No | Unarmed / Arming-In-Progress | None | None |
| No | Yes | Unarmed / Arming-In-Progress | None | None |
| Yes | No | Armed | None | None (user-configured policy is for phone not to alert on proximity loss) |
| Yes | No | Armed | None | Alert (user-configured policy is for phone to alert on proximity loss) |
| Yes | Yes | Suspecting – protect data and/or send alerts | Track – alerts keep arriving but showing no significant movement | None (user-configured policy is for phone not to alert on proximity loss) |
| Yes | Yes | Suspecting – protect data and/or send alerts | Track – alerts keep arriving but showing no significant movement | Alert (user-configured policy is for phone to alert on proximity loss) |
| Yes | Yes | Suspecting – protect data and/or send alerts | Alert (e.g owner, user, guard) – alerts show significant movement or stop arriving abruptly | None (user-configured policy is for phone not to alert on proximity loss) |
| Yes | Yes | Suspecting – protect data and/or send alerts | Alert (e.g owner, user, guard) – alerts show significant movement or | Alert (user-configured policy is for phone to alert on proximity |

Fig. 11B

| Manual Arming | Automatic Arming |
|---|---|
| Keyboard function/key | Location/Time of Day |
| NFC tapping | Disconnection from network |
| Physical switch/button | Loss of Bluetooth Proximity |
| Voice command | Loss of user's face in camera |
| Biometric/Fingerprint | Closing Lid/device movement |
| Movement sequence | Device idleness |
| Software switch/button | Loss of Private Area Network Comm. |
| Icon Selection | Timer |

Fig. 13

| Manual Disarming | Automatic Disarming |
|---|---|
| Nearfield Communication | Bluetooth proximity detected |
| Password entry | User ID via camera |
| Voice command | Presence of known network connx. |
| Biometric/Fingerprint | Private Area Network Comm. detected |
| Movement sequence | Geographic location identification |

Fig. 15

| | Unarmed | Arming-in-Progress | Armed | Suspecting |
|---|---|---|---|---|
| Trigger to start arming process (if not mechanical) | Yes - NFC, button, keyboard, or other | No | No | No |
| Trigger to complete arming process | No | Yes: proximity sensor or similar sensor | No | No |
| Trigger to detect possible theft event | No | No | Yes: movement sensor | No |
| Trigger to initiate anti-theft response | No | No | No | Yes: communication systems powered |
| Trigger to start disarming process | No | No | Yes: proximity sensor, or other user presence sensor | Yes: Proximity sensor or other user presence sensor |
| Trigger to complete disarming process | No | Yes: keyboard | No | No |

Fig. 24

| | Thief can steal data and asset | Owner may end up with unusable system |
|---|---|---|
| No Override | No | Yes |
| Override with Special Password | No | Yes |
| Unsecured override with no state change | Yes | No |
| Unsecured override, with Suspecting state, and hard antitheft actions | No | Yes |
| Unsecured override, with suspecting state, and soft antitheft actions | No | No |

Fig. 26

ALWAYS-AVAILABLE EMBEDDED THEFT REACTION SUBSYSTEM

CROSS-REFERENCE TO RELATED APPLICATION

This patent application is a U.S. National Phase Application under 35 U.S.C. §371 of International Application No. PCT/US2011/067059, filed Dec. 22, 2011, entitled ALWAYS-AVAILABLE EMBEDDED THEFT REACTION SUBSYSTEM.

FIELD OF THE INVENTION

The present invention relates to security, and more particularly to an always-available embedded theft reaction system.

BACKGROUND

Full disk encryption (FDE) technologies are designed to protect the data in case the platform is stolen. Such technologies can be either software-based or hardware-based. These technologies rely on the end-user providing a password on boots from certain states in order to unlock the access to data stored on device. However, FDE protects a computer's data-at-rest only when it is not decrypted yet, e.g. when it is being booted.

Another theft protections system is a software-based alerting mechanism. Software-based alerting mechanisms provide an immediate alert capability in order to protect against theft. The problem is that these mechanisms are susceptible to software-based attacks by thieves (e.g., turning off the WIFI radio), simple hardware-based attacks by thieves (e.g., pressing the platform's power button for 4 seconds).

Another theft protection system relies on discrete hardware components containing trigger-based alerting mechanisms. An example for this is a disk-on-key like component that gets plugged into the PC. However, this requires an additional plug-in device, and only works when the computer system is already active. In addition, a thief can easily destroy such components while keeping the platform intact, e.g. drown it in a glass of water, or bring down a hammer on it.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 is one embodiment of a table of actions at each of the states shown.

FIG. 11B is a table of one embodiment of the various situations that may be encountered by the system, and the reaction at the platform, server, and user-carried device.

FIG. 13 lists exemplary manual or automatic arming mechanisms.

FIG. 15 lists exemplary manual or automatic disarming mechanisms.

FIG. 24 shows an exemplary list of arming modes and associated types of input that would be recognized.

FIG. 26 compares the anti-theft mechanism's override mechanism with other possible override mechanisms.

DETAILED DESCRIPTION

A technology that provides a reaction to a theft attempt in an embedded, secure, and always-available way is disclosed. The technology, in one embodiment operates in all platform power states, as long as there is a large enough power source connected to the platform. The technology, in one embodiment, does not allow software-based attacks by a thief or malicious software. The technology also protects against hardware-based attacks.

The following detailed description of embodiments of the invention make reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
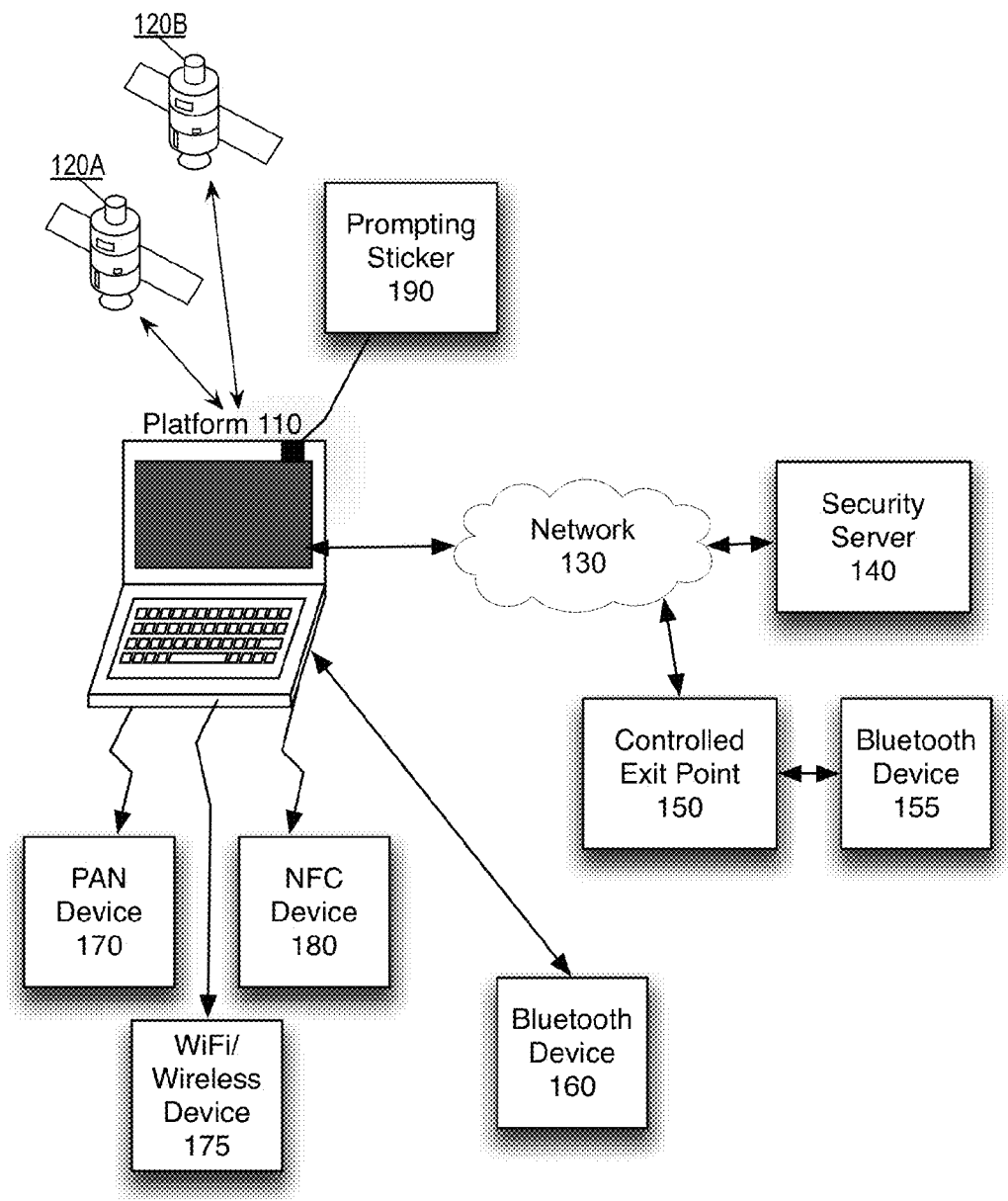
FIG. 1 is a diagram of one embodiment of a platform in an environment.

FIG. 1 is a diagram of one embodiment of a platform in an environment. The platform 110 in one embodiment may be a laptop computer. The platform 110 may be another type of computing device, such as a netbook, a tablet computer, a mobile device, or another type of computing device. The platform 110 in one embodiment includes network connection, enabling the platform to connect to a network 130.

In one embodiment, platform 110 may be in communication with a security server 140, or another of device via network 130. Network 130 in one embodiment is accessed through a network interface, such as a WiFi network, a wired network, or another type of network.

In one embodiment, the platform 110 is directly coupled to a personal area network (PAN) device 170. The personal area network may be a Bluetooth network. Thus, Bluetooth device 160 can be connected to the platform 110.

In one embodiment, the platform 110 is paired with a near field communications (NFC) device 180. The NFC device may be a badge, an RFID, a chip or sticker in a mobile telephone, or other system carried by the authorized user which includes an NFC chip. Similarly, a wireless/WiFi device may be coupled to platform 110 either directly or through network 130.

In one embodiment, the platform 110 may be able to receive location data through GPS 120A, 120B, as is known in the art. In one embodiment, the platform 110 may obtain its data from a network connection, using wireless hub data, from cellular network triangulation, from accelerometer data (not shown), or from a combination of these and/or other location-data indicators.

In one embodiment, there may be a controlled exit point 150 in the environment where the platform 110 is used. A controlled exit point 150 exists in an environment where security server 140 is capable of sending alerts to a controlled exit point 150 upon suspicion of theft of the platform. A controlled exit point 150 may be an exit point with a guard who can be alerted, a gate or door that can be locked, or an exit point with a different type of exit control mechanism. In one embodiment, the controlled exit point may include a Bluetooth device 155 which can detect the platform's proximity to the exit point 150 by detecting its Bluetooth device 160.

In one embodiment, the platform 110 may include a prompting sticker 190. The prompting sticker 190 attempts to protect the data on the platform, even if the platform is stolen. Most thieves steal platforms for the platform itself, and not the data on it. Therefore, in a system which includes full disk encryption on the platform, the thief is made aware, via sticker 190 that the platform will send an alert unless all power sources are removed immediately. For example, the sticker 190 may read "This platform contains an Anti-Theft Response Embedded Subsystem. Upon theft, a blinking LED will indicate that the platform's owner will be alerted about the theft. In order to stop the alerting, remove the AC connection and battery."

This would prompt a rational thief to take out all visible electrical sources—AC and main battery—thus suppressing the alert. The action of taking out the electrical sources will place the platform in G3 state (Mechanical Off). Since the HDD/SSD loses power, its data is now protected. On next booting up of the platform, the full disk encryption will be active, and the data will only be accessible by successfully entering the password at a password prompt. Note that in the case of false positive, when the platform suspects there is a thief but it is actually the authorized user, no power transition occurs, and hence there is no issue of disrupting processes or losing data. This solution can be especially relevant to market segments in which the cost of a breach of on-platform data can reach many times that of the cost of platform asset replacement.

The system provides the platform 110 with an always-on, always-available security system that provides protection to the platform 110. In one embodiment, the platform 110 may also be paired with a PAN device 170, thereby providing protection for both the platform 110 and the PAN device 170.

Figure 2A:
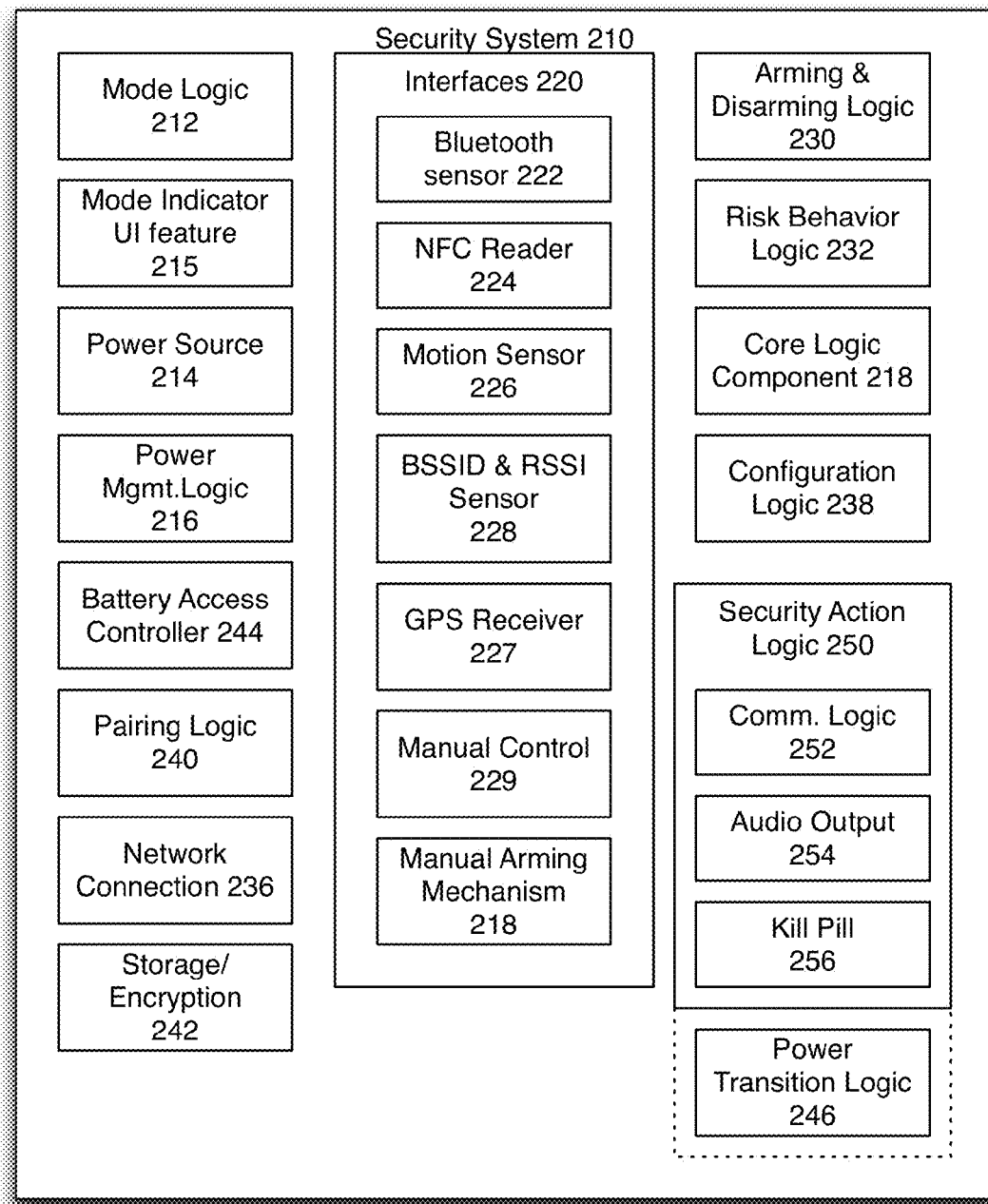
FIG. 2A is a block diagram of one embodiment of a platform implementing the security features of the invention.
Figure 2B:
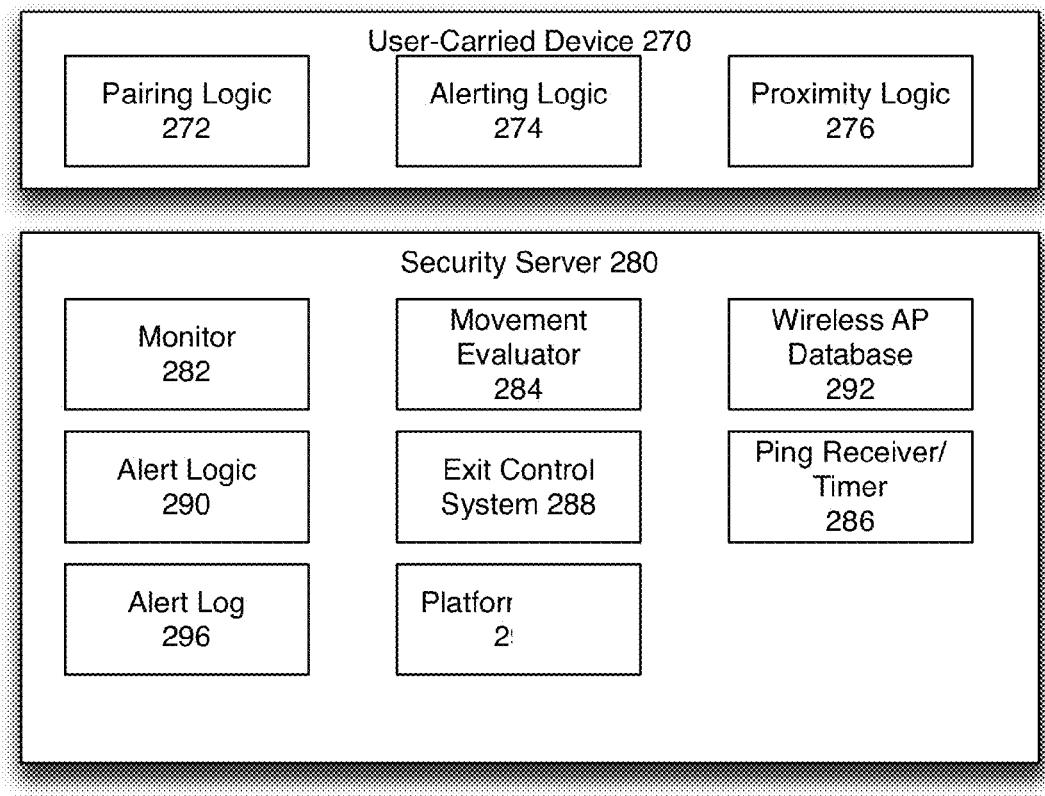
FIG. 2B is a block diagram of one embodiment of additional systems that may be associated with the platform.

FIG. 2A is a block diagram of one embodiment of a platform implementing the security features of the invention, while FIG. 2B are block diagrams of one embodiment of related devices. The security system 210 in one embodiment includes a mode logic 212. State logic 212 manages the modes of the mechanism. In one embodiment, the modes of the mechanism include unarmed (no protection), armed (protected), arming-in-progress (transition phase between unarmed and armed), and suspecting (armed, and suspecting theft). In one embodiment, mode indicator UI feature 215 indicates visually the current mode of the platform. In one embodiment, the mode indicator UI feature 215 is an LED, which indicates mode by a flashing pattern. In one embodiment, the mode indicator UI feature 215 is a multi-color LED, which indicates mode by a color. Alternative methods of visually indicating the current mode may be used.

Power source 214 may include AC (alternating current) as well as battery power. In one embodiment, security system 210 may include battery access controller 244 to control access to the battery compartment, as will be described in more detail below.

In one embodiment, security system 210 includes power management logic 216. The power management logic 216 controls power to the various elements which maybe associated with security system 210. In one embodiment, in order to reduce power consumption in lower power states (e.g. sleep and hibernation) the system may selectively power a subset of the elements of the security system 210. This will be described in more detail below. In one embodiment, power transition logic 246 controls the platform through a plurality of power states. The power states, in one embodiment include S0 (ON) through S5 (OFF). Power transition logic 246 moves the system between the power states, waking up, as well as one or more sleep states, hibernation, and off.

Core logic component 218 is the processor associated with the security system 210. Core logic 218 in one embodiment receives data from interfaces 220. Interfaces 220 may include one or more of: a Bluetooth sensor/communicator 222, an NFC reader 224, a motion sensor 226, GPS receiver 227, RSSI sensor 228, manual control 229, and manual arming mechanism 218. These interfaces 220 are used, in one embodiment, to detect user input, theft risk, and other events that may influence the security system 210.

Pairing logic 240 is used, in one embodiment to set up a pairing between the security system 210 and another device. The other device may be a mobile device including a Bluetooth connection, an NFC device, or another device that may be used to arm/disarm, notify, or otherwise interact with the security system 210. The pairing, in one embodiment, uses the unique identification of the paired device to ensure that the authorized NFC device, Bluetooth device, or other device type is being used.

In one embodiment, the system includes an arming logic and disarming logic 230. The arming & disarming logic 230 transitions the platform from the unarmed mode to the armed mode, and vice versa. In one embodiment, the arming & disarming logic 230 is also responsible for the arming-in-progress mode. In one embodiment, arming & disarming logic 230 communicates the mode information to the mode logic 212, and core logic component 218. In one embodiment, when the security system 210 is suspecting theft, storage/encryption logic 242 encrypts the data on the platform to prevent access to the platform.

Risk behavior logic 232 uses data from interfaces 220 to detect risk behaviors, when the platform is in the armed or arming-in-progress modes. Risk behavior logic 232, in one embodiment, communicates with core logic component 218 regarding the detected risk factors.

Security action logic 250 takes a security action, when the core logic component 218 determines, based on information from risk behavior logic 232, that the device is in a risk situation. In one embodiment, security action logic 250 may take advantage of communication logic 252 to send a message to a user carried device 270, a security server 280, or another device. In one embodiment, the network communication to the user carried device 270 or the security server 280 takes the form of reporting presence or proximity. In one embodiment, a lack of that reporting constitutes a suspicion of theft. Security action logic 250 may also include audio output 254 to sound an audio alarm. In one embodiment, security action logic 250 may also include a kill pill 256. A kill pill 256 renders the platform inoperable. In one embodiment, it also destroys data on the platform. In one embodiment, kill pill 256 is a self-kill pill automatically implemented within the platform. Kill pill 256 in one embodiment is authorized by the user, as will be described below. The kill pill 256 in one embodiment is authorized by a service. In one embodiment, storage/encryption 242 deletes the data when the kill pill 256 is invoked. In one embodiment, security action logic 250 may trigger power transition logic 246 to transition the system to a different power state.

Configuration logic 238 configures the settings of the security system 210. In one embodiment, configuration logic 238 has a user-modifiable and an administrator-modifiable portion.

Network connection 236 is used to send data to security server 280 and/or user-carried device 270.

FIG. 2B is a block diagram of one embodiment of additional systems that may be associated with the platform. In one embodiment, user-carried device 270 is paired with the security system 210. Pairing logic 272 handles the pairing for the user-carried device 270. Alerting logic 274 enables the platform to send alerts to the user via SMS, MMS, Bluetooth, personal area network (PAN), or another alerting mechanism. In one embodiment, Alerting logic 274 will provide an alert to the end-user based on lack of communication from the platform. Proximity logic 276 monitors proximity of the platform, in a two-way-monitoring situation, in one embodiment.

Security server 280 is a server to which the security system 210 may send data. Security server 280 includes, in one embodiment, a monitor 282 to receive data from the platform. In one embodiment, monitor 282 receives alerts from the platform. Server 280 includes a ping receiver/timer 286, which monitors subsequent messages from the platform, once the initial message indicating that the platform is suspecting theft is received. This ensures that a response is carried out, if a thief successfully disables the platform and keeps it form sending out subsequent messages. In one embodiment, the Security server 280 contains or has access to a Wireless AP database 292 which can help translate raw information received regarding Wireless Access Points (e.g., BSSIDs and RSSI) to location information. In one embodiment, the Security server 280 contains or has access to a platform ID database 294 which maps the platform ID of the platform reporting its mechanism mode to user-specific information. The platform ID database can be used to take user-specific policy decisions or to alert specific users. In one embodiment, the Security server 280 contains an Alerting log 296 which can help IT determine whether the data on a platform that was stolen is protected, based on previous communications with the platform. This information may be used to trigger a remote kill pill.

In one embodiment, the platform 210 sends movement information, from motion sensor 226 and/or BSSID and RSSI sensor 228, or GPS receiver 227, to the security server 280. The movement information is evaluated by movement evaluator 284, to determine whether the platform is being stolen. If so, security server 280 may send an alert, via alerting logic 290. In one embodiment, security server 280 also has messaging for exit control system 288. Exit control system 288 sends messages to a controlled exit point upon suspicion of theft of the platform. A controlled exit point may be an exit point with a guard who can be alerted, a gate or door that can be locked, or an exit point with a different type of exit control mechanism. When the message from the security server 280 is received, the exit is locked and/or the guard is alerted, to enable them to search.

Figure 3:
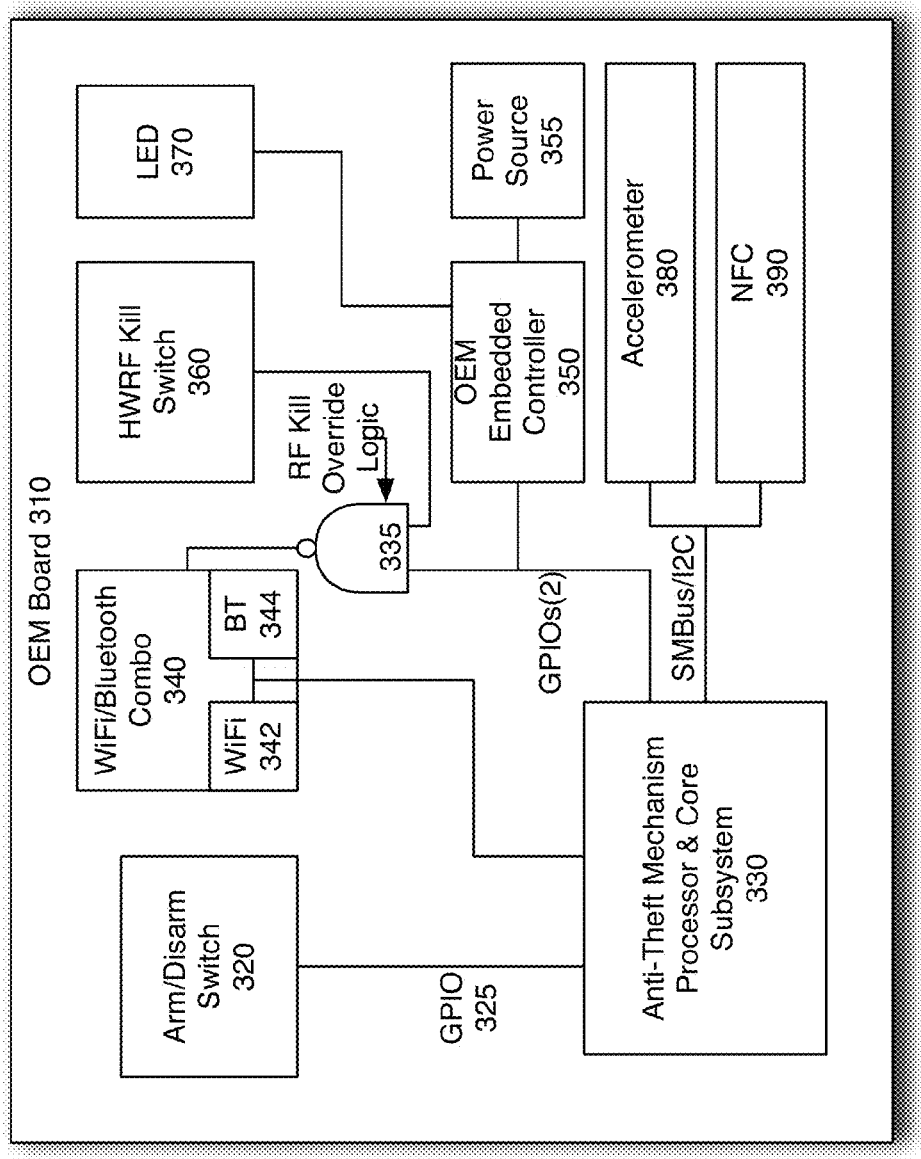
FIG. 3 is a diagram showing one embodiment of separately powered subsystems within the platform.

FIG. 3 is a diagram showing one embodiment of separately powered subsystems within the platform. In one embodiment, the security system is implemented in an OEM (original equipment manufacturer) board 310. The OEM board 310, in one embodiment, is built into a platform. In one embodiment, the OEM board 310 is part of a circuit board, not otherwise shown. By having the security system implemented in the OEM board 310, the system ensures that standard hardware and software attacks cannot work, by building defenses into the original hardware.

In one embodiment, the board 310 includes an anti-theft mechanism processor & core subsystem 330. The anti-theft mechanism processor & core subsystem 330 implements the logics described above.

The anti-theft mechanism processor & core subsystem 330 is coupled to the arm/disarm switch 320 and WiFi/Bluetooth 340. The subsystem 330 also receives data from accelerometer 380 and NFC reader 390.

The hardware RF kill switch 360, which is present in many devices, has an RF Kill Override 335. This enables the anti-theft mechanism processor & core subsystem 330 to override the switch 360. The arming/disarming switch 320 is coupled, via GPIO directly to the core 330. The accelerometer 380 is directly coupled to the core 330. The NFC 390 is coupled to the core 330. The OEM embedded controller 350 is coupled to the power source 355 and LED 370.

In one embodiment, the OEM board 310 provides a secure path from the core subsystem 330 to each peripheral used for disarming or security actions, such as WiFi/Bluetooth 340, accelerometer 380, NFC 390, and others. The path from the core logic 330 to the peripherals 340, 380, 390, in one embodiment, uses dedicated busses. This means it is not possible for another entity to spoof traffic, monitor secrets, or cause a denial of service. In one embodiment, the controllers are themselves secure, such that no one can hack into them. This ensures that no one can perform a firmware update on these controllers to an unauthorized or blacklisted image, no one can hang these controllers, etc.

In another embodiment, instead of a dedicated connection, there may be an authenticated (non-dedicated) connection between the core subsystem 330 and the peripherals.

In another embodiment, instead of a dedicated connection there may be an encrypted (non-dedicated) connection between the core subsystem 330 and the peripherals. This ensures that the target of a message knows that the message could not be read by anyone.

In another embodiment, instead of a dedicated connection there may be an authenticated and encrypted connection between the core subsystem 330 and the peripherals.

In one embodiment, the connection type between each peripheral and the core system may depend on the type of processing and data exchange between that peripheral and the core subsystem. For example, in one embodiment, the NFC reader 390 reads the tag, and the core subsystem 330 performs the comparison to ensure the NFC device is authorized. In such a case, the connection between the core system 330 and NFC reader 390 should be authenticated and encrypted, when not dedicated. On the other hand, if the NFC reader 390 did the processing on its side and only sent the core subsystem 330 an OK/Not OK message, the connection should be authenticated, but need not be encrypted since no secret data is passed. The accelerometer 380, for example, is at risk for a denial of service attack. If a thief manages to cause denial of service (or to spoof message), then the system cannot successfully detect that the platform has been moved by the thief. Therefore, the connection between the core system 330 and the accelerometer 380 should be dedicated.

Figure 4:
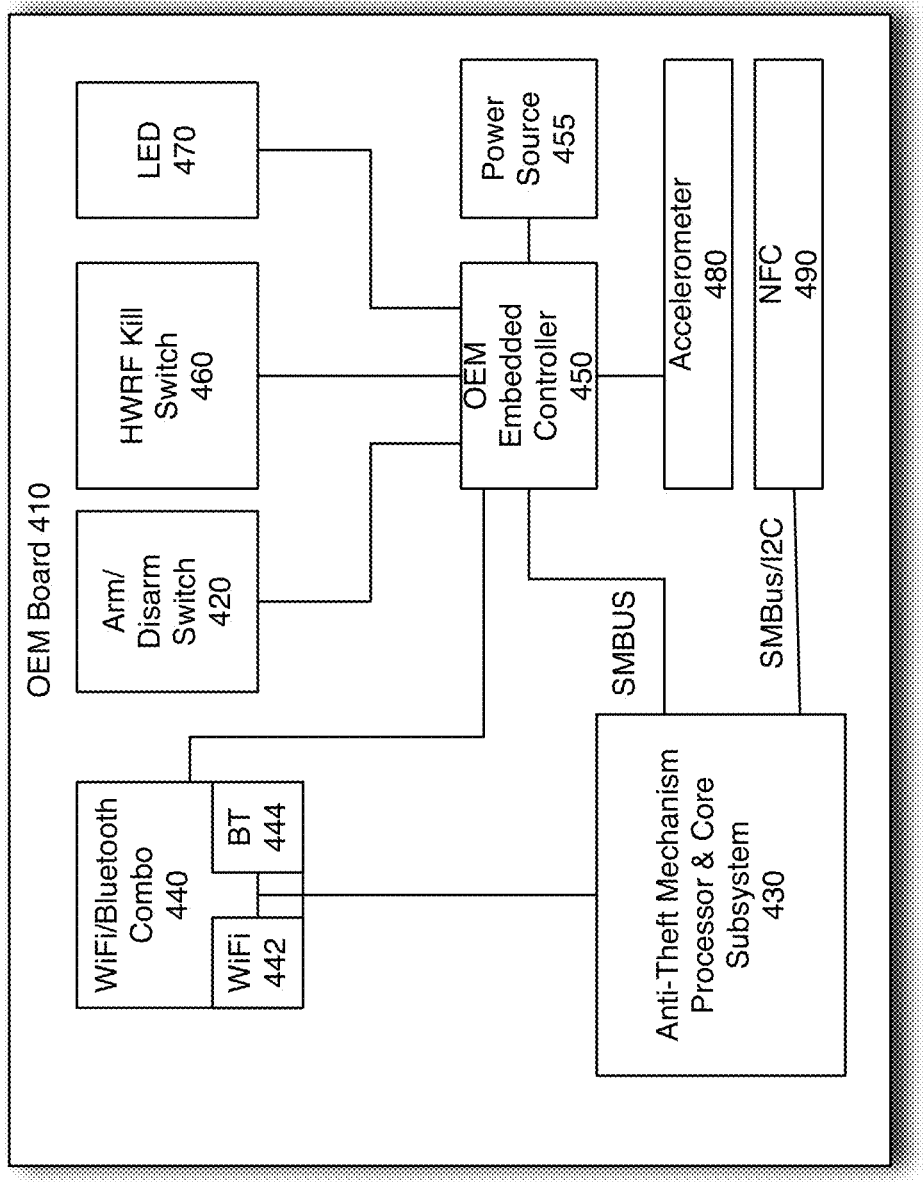
FIG. 4 is a diagram of one embodiment of the platform.
Figure 5:
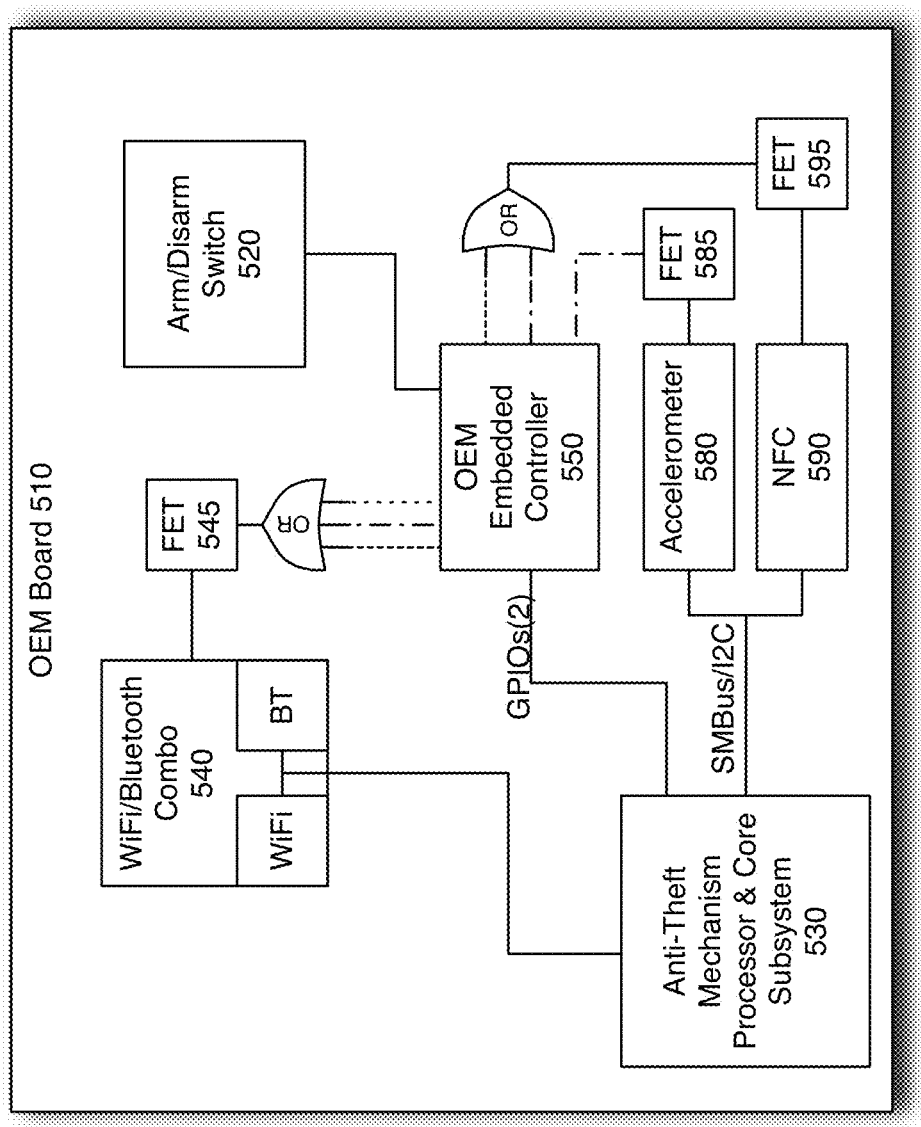
FIG. 5 is a diagram of another embodiment of the platform.

FIG. 4 is a diagram of one embodiment of the platform. In the embodiment shown in FIG. 4, rather than direct connections between the core 430 and the various elements, those elements are coupled to the OEM embedded controller 450. In one embodiment, the core 430 is coupled directly to the WiFi/Bluetooth 440 and NFC reader 490. Other elements are coupled through embedded controller 450. In one embodiment, embedded controller 450 overrides the hardware RF kill switch FIG. 5 is a diagram of another embodiment of the platform. The embodiment uses an efficient power design. The OEM embedded controller 550 controls the power rails to the FETs 585, 595, 545.

In one embodiment, the arm/disarm mechanism 520 is a mechanical switch, and thus does not need to reside on a power rail controlled by the OEM embedded controller 550.

In one embodiment, the WiFi and Bluetooth devices 540 are used as triggers for arming/disarming. Therefore, the WiFi and/or Bluetooth receiver should be powered when arming or disarming signal may be received. The WiFi device may also provide alerts in Suspecting modes, thus, in the suspecting mode, the OEM controller 550 powers the WiFi and/or Bluetooth.

The NFC 590 is an alternative method of starting the disarming process, thus the power is supplied to the NFC 590 when disarming may occur.

The below table illustrates one embodiment of which elements are powered at what time. In one embodiment, the OEM embedded controller 550 provides power to the WiFi, Bluetooth, Accelerometer, and NFC selectively. The X-marks show the actions for which each of the elements is powered.

|  | Trigger to complete Arming | Trigger to Detect Theft Event | Device Used for Asset Protection | Trigger to Start Disarming |
|---|---|---|---|---|
| WiFi | X |  | X | X |
| Bluetooth | X |  |  | X |
| Accelerometer |  | X |  |  |
| NFC |  |  |  | X |

Figure 6A:
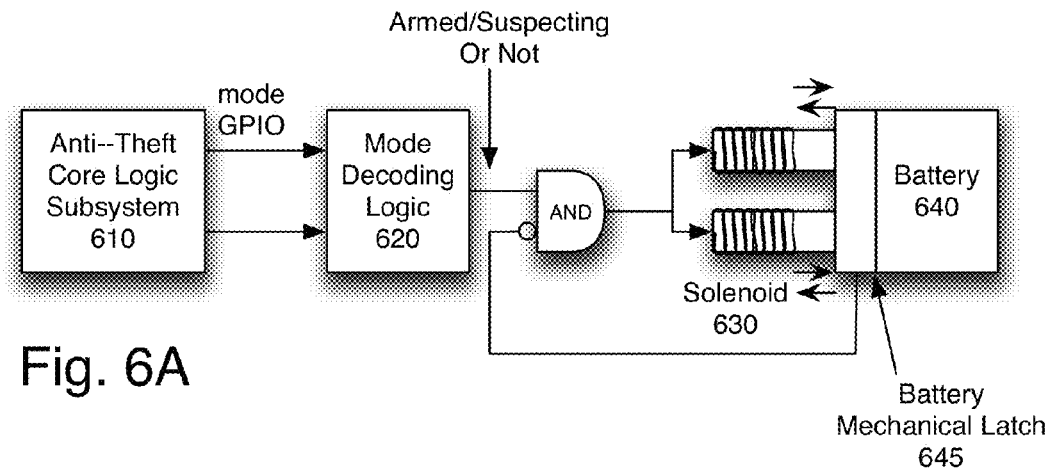
FIG. 6A is a diagram of one embodiment of the battery-removal protection system.

FIG. 6A is a diagram of one embodiment of the battery-removal protection system. By preventing the battery removal, the system eliminates the opportunity for the thief to remove all major power sources to the platform, so that the platform can complete its protective activities.

The anti-theft core logic subsystem 610, in one embodiment, passes its data to a mode decoding logic 620. The battery 640 is protected by solenoid 630. When the device mode is in the Armed or Suspecting modes, the solenoid 630 keeps the battery compartment closed, forcing the battery 640 to remain attached. Even when external power is removed, the solenoid 630 remains closed. In this way, when a thief attempts to remove the battery 640, it is locked and cannot be removed. However, the authorized user or administrator, who can disarm the platform, can remove the battery 640 without difficulty.

In one embodiment, in order to reduce solenoid power consumption to a minimum, a battery mechanical latch 645 can exist as well, such that the battery 640 cannot be removed if either the mechanical latch 645 is closed or the solenoids 630 are activated, and the solenoids 630 do not get activated as long as the mechanical latch is closed.

Figure 6B:
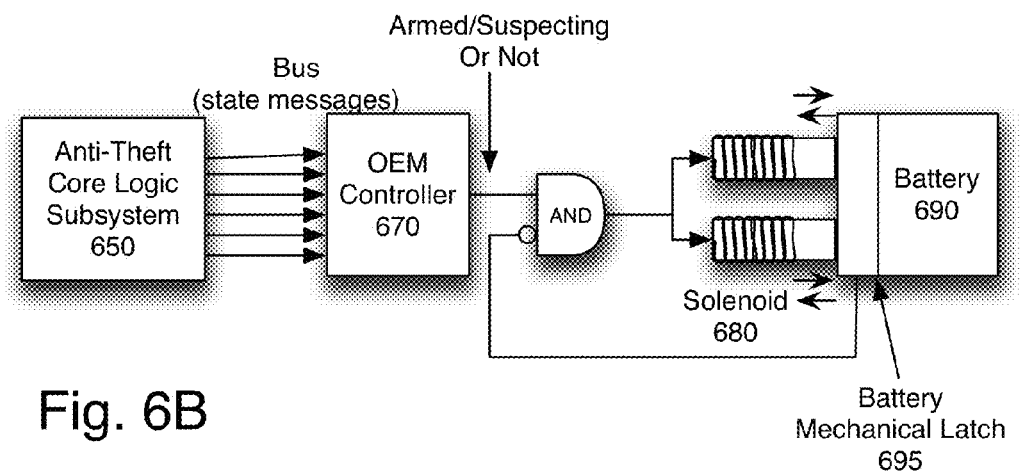
FIG. 6B is a diagram of another embodiment of the battery-removal protection system.

FIG. 6B is a diagram of another embodiment of the battery-removal protection system. The core subsystem 650 provides mode messages to the OEM controller 670. The OEM controller 670 provides signals to the solenoid 680 to lock in the compartment to protect battery 690, when the device is in the armed or suspecting mode. In one embodiment, in order to reduce solenoid power consumption to a minimum, a battery mechanical latch 695 can exist as well, such that the battery 690 cannot be removed if either the mechanical latch 695 is closed or the solenoids 680 are activated, and the solenoids 680 do not get activated as long as the mechanical latch 695 is closed.

Figure 7:
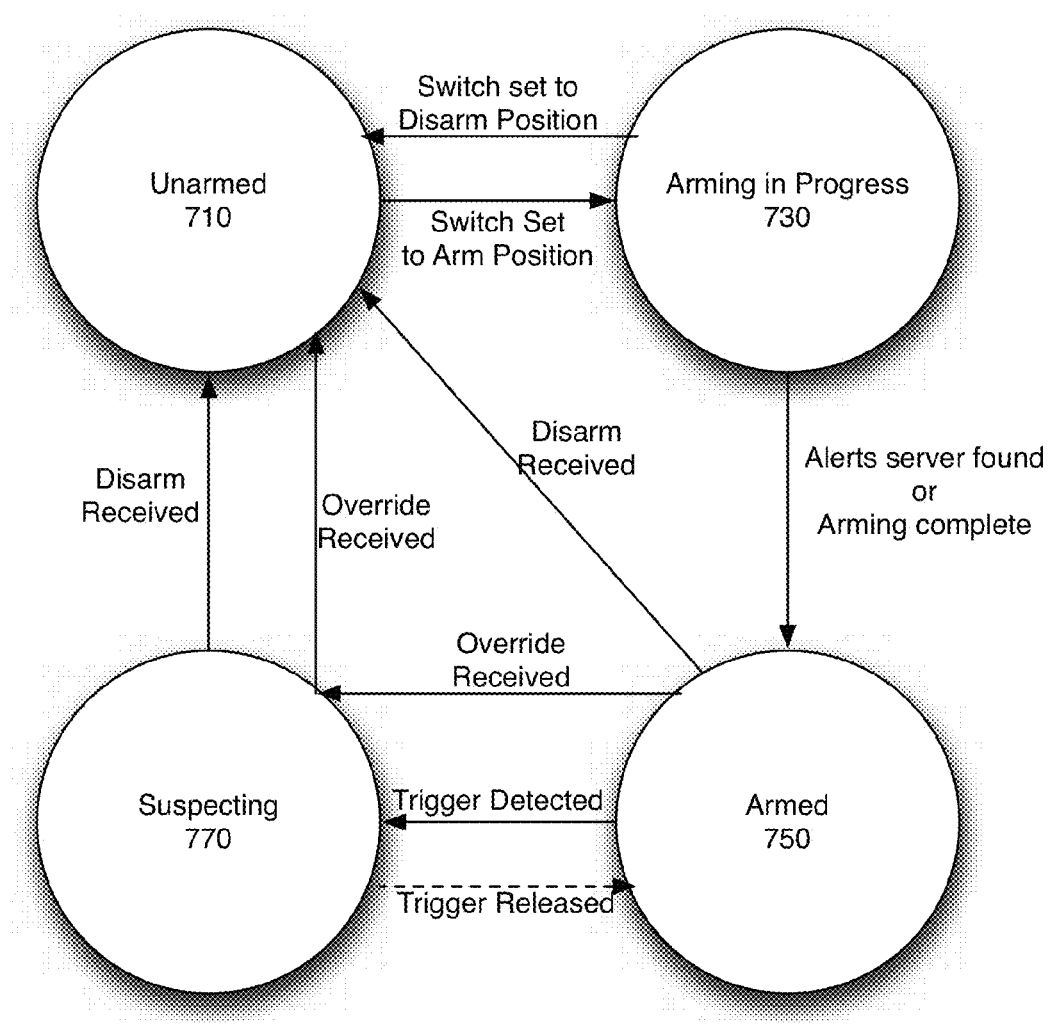
FIG. 7 is a state diagram of one embodiment of the states of the platform.

FIG. 7 is a mode diagram of one embodiment of the modes of the platform. The modes, in one embodiment, including Unarmed 710, Arming in Progress 730, Armed 750, and Suspecting 770 modes.

In the Unarmed mode 710, the platform is not protected or locked, and the data is not encrypted. When the authorized user is utilizing the platform, this is the mode. In one embodiment, the platform transitions from the Unarmed mode 710 to the Arming in Progress mode 730 when the user sets a switch to the arm position, or otherwise initiates the arming of the platform. In one embodiment, the switch may be a manual switch. In one embodiment, the switch may be a soft switch, a combination of keys on a keyboard, or another type of manual activation.

The Arming-in-progress 730 mode is an intermediate stage, while the system completes the arming. In one embodiment, the platform remains in the Arming in Progress mode 730 until the arming is complete. Generally, arming cannot complete due to an inability to complete one or more steps that the protection policy dictates—for example, inability to connect to the alerting server when the protection policy requests an alert to the server. In either case, the system may alert the authorized user/administrator that arming could not be completed. In one embodiment, the user may disarm the platform while it is in the Arming in Progress mode 730 without authentication, to return to the Unarmed mode 710. Once the arming is complete, the platform is in the Armed mode 750.

In the Armed mode 750, in one embodiment, the platform is protected. This may include a requirement to encrypt the data on the platform in case the platform subsequently moves to Suspecting mode. It includes a requirement to disarm the platform in order to access the data or take it without an alert being sent out. It also means that the security system is monitoring the platform to detect any suspicious activities that may trigger certain responses. The system goes from the Armed mode 750 to the Unarmed mode 710, when disarming instructions are received. In one embodiment, disarming requires an indication of the presence of the authorized user.

When in the Armed mode 750, if the system receives an indication of theft, e.g. a suspicious interaction, the system moves to a Suspecting mode 770. In the Suspecting mode 770, the system responds by performing security actions. In one embodiment, the system sends an alert to a user and/or server. In one embodiment, the system protects the system's data-at-rest. In one embodiment, the system can return from the Suspecting mode 770 to the Armed mode 750, if certain triggers causing the suspicion are released. For example, the platform may return to an allowed area. In one embodiment, the trigger may be released if no additional suspicious activity is detected for a period of time. In one embodiment, no trigger releases are allowed, and the user has to explicitly disarm the device to move it from the Suspecting mode.

The user may also disarm the device, when it is in the Suspecting mode 770, moving it to the Unarmed mode 710. In one embodiment, an authorized user or administrator may also use an override to move from Suspecting 770 mode to the Unarmed mode 710, or from the Armed mode 750 through Suspecting mode 770 to the Unarmed mode 710, through an alternative mechanism. This enables recovery of the system if the user's password or linked device is lost, or if the linked device malfunctions or loses power.

Figure 8:
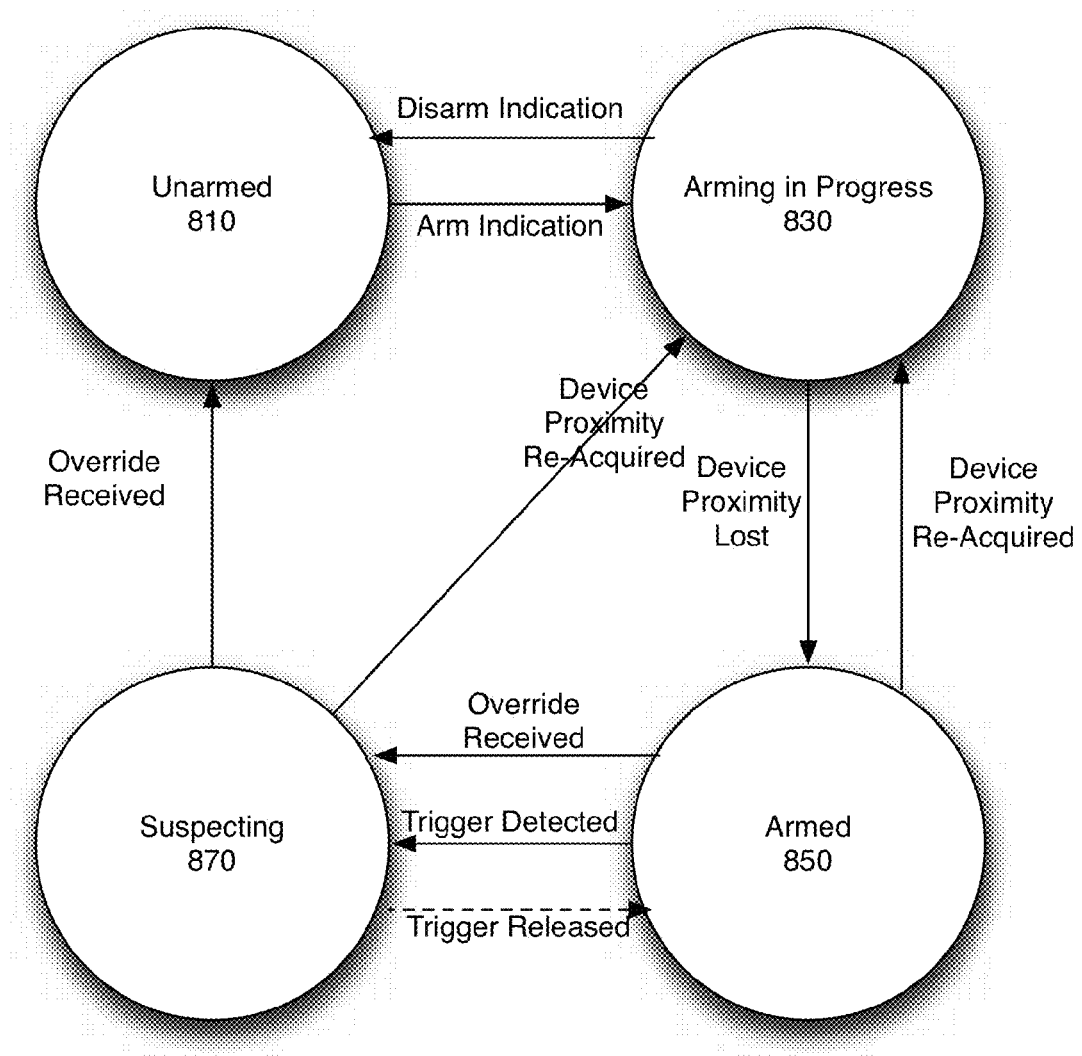
FIG. 8 is a second state diagram, shown another embodiment of the states.

FIG. 8 is a second mode diagram, shown another embodiment of the modes. As can be seen, the same four modes are present. However, in this example, the proximity information from a linked Personal Area Network (PAN) device is used to activate the system. In one embodiment, the PAN device is a mobile phone including Bluetooth pairing ability.

As shown, when platform is stationary and the authorized user is near the platform, it does not suspect theft, and remains in the Unarmed mode 810. In one embodiment, the user initiates the "Arming in Progress" mode, which starts monitoring the proximity of the authorized user to the platform.

If the device proximity is lost, the system moves from the Arming in Progress mode 830 to the Armed mode 850. Once in the Armed mode 850, when platform is stationary and the end-user is away from the platform, it does not suspect theft. However, when platform is stationary, the end-user is away from the platform, and it is moved, the platform suspects theft. This causes the mode to move to Suspecting 870.

In one embodiment, when platform is mobile (in-transit) with proximity to the paired device (e.g. with the authorized user) it does not suspect theft, regardless of whether the end-user is moving it or not. In one embodiment, the mode then remains in the Arming in Progress mode 830.

However, when platform is mobile (in-transit) with the user and someone takes it away from the user beyond the Bluetooth proximity limit, the system recognizes that the Bluetooth proximity has been lost, and moves to the Armed mode 850. It automatically moves to the Suspecting mode 870, due to the movement, which causes it to suspect theft.

In one embodiment, when platform is mobile (in-transit) with the end-user and the end-user places it down and moves away from it, the platform will not suspect theft. The system will, however transition to the Armed mode 850. At that point, if someone other than the end-user picks it up, the platform suspects theft, and transitions to the Suspecting mode 870. This occurs when movement happens without a prior reacquisition of the user's device proximity. In one embodiment, if the user configured the Bluetooth device to alert the user on Bluetooth proximity loss of the platform, the Bluetooth device will alert the user when proximity is lost.

As noted above with respect to FIG. 7, the system may provide override, as well as disarming capabilities and trigger releases.

In one embodiment, the system is in the Armed mode 830, rather than the Arming-in-Progress mode 850, when the paired Bluetooth device is in proximity. The trigger to move from Armed mode 850 to Suspecting mode 870 is movement of the platform away from the stationary paired device (via detection of proximity loss), or movement of the paired device from the stationary platform.

FIG. 9 is one embodiment of a table of actions at each of the modes shown. In one embodiment, there is an LED (light emitting diode) or similar visual mode indicator. In one embodiment, the LED shows the modes (e.g. unarmed, arming, armed, suspecting). The LED may have different colors, or blinking/shining patterns or intensities for the various modes.

The system sends various packets, as it enters the various modes. As it enters the Unarmed mode, in one embodiment, it sends a disarm packet, to a server which may have been alerted that the platform was armed. When the system is in the arming-in-progress mode, an initial connection is sent to the server, in one embodiment. In the armed mode, in one embodiment, the armed pings are sent to the server. If the system enters the Suspecting mode, the information regarding the suspicion is sent. In one embodiment, the information may include the platform's status and environment indicators, such as RSSI of wireless access points in the vicinity, accelerometer data, Bluetooth proximity data, data protection policy, etc.

The configuration of the system enables changes to system settings. Configuration is unblocked when the system is unarmed, and blocked when the system is armed or suspecting. When arming is in progress, the system is in process of blocking configuration. In one embodiment, any time the mode is not unarmed, configuration is blocked.

A transition timer is used to monitor transition between power states. The transition timer is canceled when the system is not in suspecting mode, since the system does not transition out of this mode until a suspicion trigger is received. When the system is not in the suspecting mode, transition to the hibernation power state is canceled. In the Suspecting mode, the transition timer is used to transition the system to the hibernation state. In the hibernation state, the data is encrypted on a system with full disk encryption, and a full disk encryption password is needed to access the data. Therefore, transitioning the platform to the hibernate power state improves the protection for the platform. However, transition to hibernate state depends on assistance from OS software or BIOS. The transition timer is used to enable protection when the BIOS or OS software cannot complete the transition to hibernation. If the transition to hibernate fails, the anti-theft mechanism can force a system power down which does not depend on OS software or BIOS assistance. This operation will also place the system in a mode where its data-at-rest is encrypted.

Figure 10:
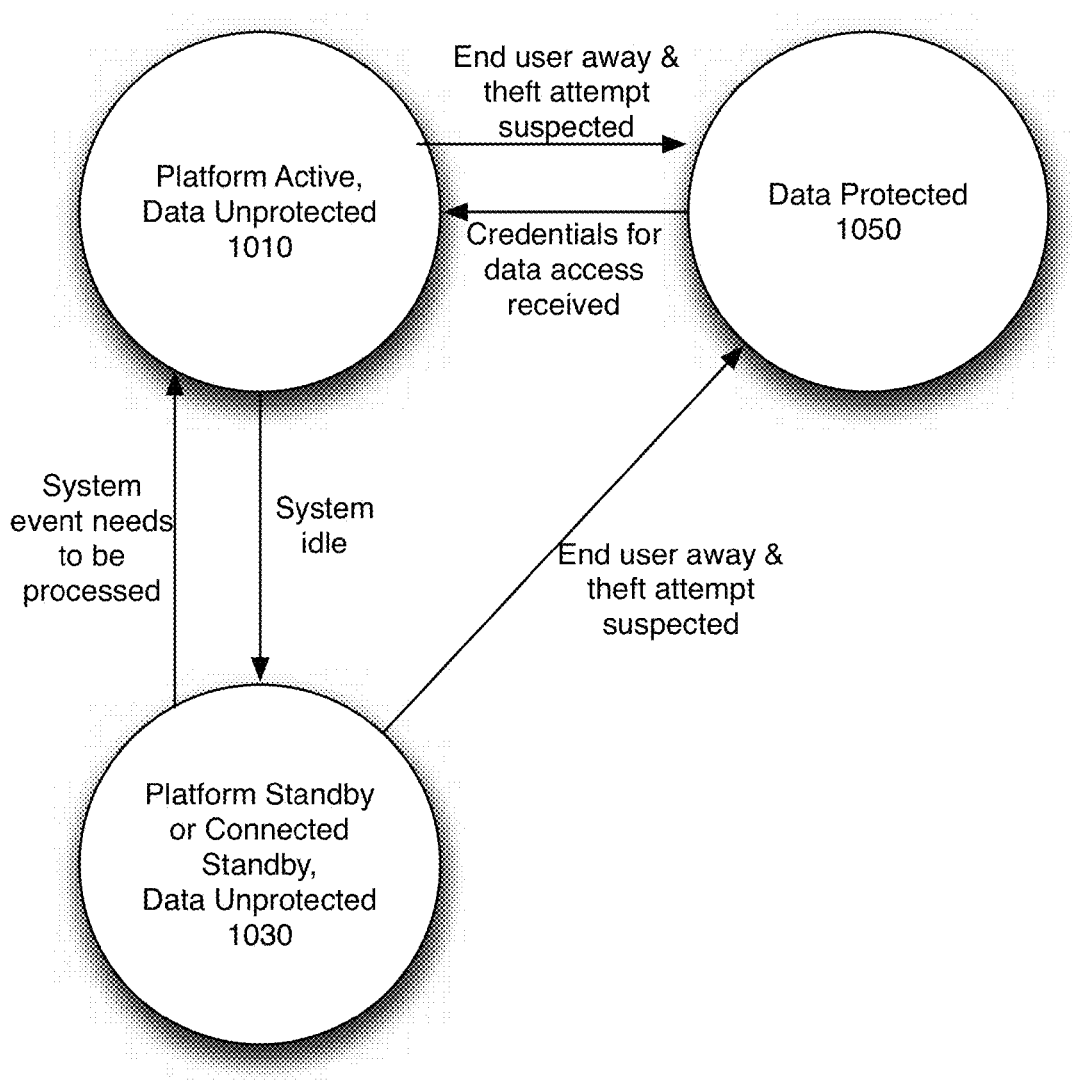
FIG. 10 is a power state diagram, showing one embodiment of the power states of the system.

FIG. 10 is a power state diagram, showing one embodiment of the power states of the system. The platform has three states, active with the data unprotected (state 1, 1010), the platform on standby or connected standby, with the data unprotected (state 2, 1030), and the data protected (state 3, 1050) with the platform neither in standby, connected standby, or active. Connected Standby refers to a state in which the platform maintains network connectivity and/or updates its data without the user perceiving the platform to be ON.

The initial state is unprotected, with the platform active. If an arming action is received followed by a suspicion trigger, the platform moves to the data protected state 1050. In this state, the data is encrypted, and the platform is protected. The initial arming action may be automatically triggered if the user walks away. This may be determined based on a paired network device, such as a mobile phone, the use of a manual key or other indicator, loss of visual identification for the user, or other arming action. The suspicion trigger may comprise detection of movement by an accelerometer, removal of AC power, undocking, or another indicator of potential theft.

If the platform is inactive, after a certain period of idleness it moves to the standby state or connected standby state, but remains unprotected, state 1030, in one embodiment. In one embodiment, the transition to Standby state or Connected Standby state may occur due to an explicit request by the user. If, in the standby state 1030, an event is received which needs to be processed, the system goes back to the platform active state 1010.

If, while the device is in standby or connected standby state 1030, the user moves away from the platform, and a theft attempt is suspected, the system moves into the data protected state 1050. Once this occurs, credentials for access are required to return to the platform active, data unprotected, state 1010. In one embodiment, after a preset period of idleness has elapsed, the system may automatically go into a hibernate or similar lower power state, and initiate data protection, even without indication that the user is away or that a theft may be occurring.

Although not shown, the system can move from the standby state to hibernation or off, when further idle time is observed. In one embodiment, when the platform moves to the hibernation state, it automatically protects the platform data. In one embodiment, this is simply the default requirement of a password to allow OS boot. In one embodiment, this includes encrypting the data on the platform, prior to entering hibernation. In one embodiment, this includes a self-encrypting drive, which requires decryption on any power-on of the drive, which is an event that occurs when leaving hibernation or OFF states. These may be an aspect of full disk encryption, which may be implemented with the security system.

Figure 11A:
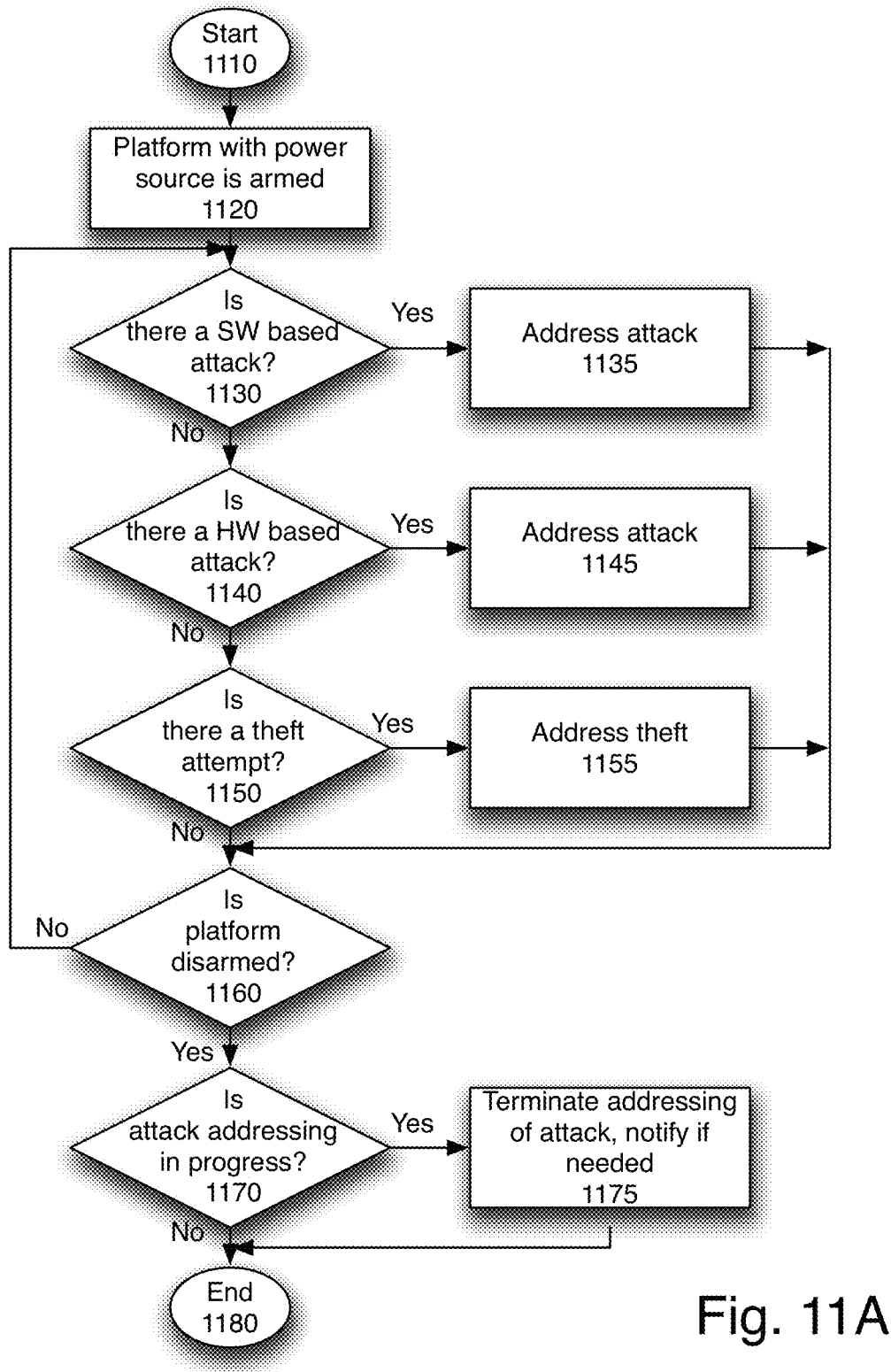
FIG. 11A is an overview flowchart of one embodiment of using the protection system in the always on, always available environment.

FIG. 11A is an overview flowchart of one embodiment of using the protection system in the always on, always available environment. The process starts at block 1110. In one embodiment, this process is active whenever the system is armed. How the system is armed and disarmed is discussed in more detail below.

At block 1120, the platform, with a power source, is armed. In one embodiment, the arming may be manual, semi-automatic (manual initiation and automatic completion), or automatic. When the platform is armed it monitors indicators of attack, whether software, hardware, or theft.

At block 1130, the process determines whether there is a possibility of a software based attack. This is done by monitoring certain actions, such as an attempt to reset settings to a default. If a software-based attack is detected, the attack is addressed at block 1135. The attack may be addressed by prohibiting the actions (e.g. an alteration of the platform, when the platform is armed). The platform may also enter a mode where data is encrypted. The platform may also send an alert to the user, at one or more predetermined locations. For example, the user may have an email address, an SMS destination, a Bluetooth enabled telephone with messaging capability etc. The system may also notify a security server. The security server may then in turn notify the user, an administrator, or another party.

The process then continues to block 1160, to determine whether the platform has been disarmed. The authorized user may disarm the platform at any time. For example, it may happen that the authorized user accidentally triggered the platform's suspicion of a software-based attempt. The user may disarm the platform to end the addressing of the attack. This may be done by demonstrating that the authorized user has control of the platform in various ways. If the platform is disarmed, at block 1170 the process determines whether an action addressing an attack is in progress. If so, the actions are terminated, and the user/server are notified if needed, at block 1175. The process then ends at block 1180, since the platform is disarmed. The process restarts when the user next arms the platform. If the platform has not been disarmed, as determined at block 1160, the process continues to block 1130 to continue monitoring for attacks.

If there is no software-based attack, as determined at block 1130, the process at block 1140 determines whether there is a hardware-based attack. A hardware-based attack may be an attempt to remove the battery, an attempt to turn off the WiFi, undocking the device, etc. If a hardware-based attack is detected, the process continues to block 1145.

At block 1145, the hardware-based attack is addressed. In general, hardware-based attacks cannot be physically prevented (e.g. the platform cannot resist the AC cord being pulled). However, a notification will be sent, whenever possible prior completion of the hardware-based attack.

In one embodiment, certain hardware attacks may be prevented by the system. For example, in one embodiment, as described above, a battery mechanical latch or solenoid-based protection system prevents removal of the battery. In one embodiment, the hardware kill switch for the WiFi is overridden by the embedded controller, thus enabling the platform to send out a notification message. The process then continues to block 1160 to determine whether the platform has been disarmed.

If no hardware-based attack is detected, at block 1150 the process determines whether there is a theft attempt. A theft attempt may be detected when the platform moves, while it is armed. If there is a theft attempt, at block 1155 the theft attempt is addressed. The theft attempt is addressed, in one embodiment, by sending notification to the user and/or security server. In one embodiment, the notification may include current location and/or movement data. In one embodiment, the system sets up a ping, to send location/motion information to the user/server periodically. In one embodiment, the system protects its data by moving into a Hibernate power state. The process then continues to block 1160, to determine whether the platform is disarmed.

In this way, the system, when armed, addresses multiple forms of potential attacks. Note that these defenses are available regardless of the power state of the platform, as long as a large enough power source is provided. Note that although FIG. 11A, and other figures, are shown as flowcharts, the organization of the flowchart is simply to group together related actions. The ordering of the actions need not be in the order shown. Furthermore, the process may separately monitor each of the settings discussed in the flowchart. For example, in the above flowchart, there may be multiple sensors monitoring for attacks. If any sensor indicates an attack, the processes associated with that attack is performed. Similarly, for the below flowcharts, it should not be read to require each step, nor the performance of the steps in the order presented.

FIG. 11B is a table of one embodiment of the various situations that may be encountered by the system, and the reaction at the platform, server, and user-carried device. As can be seen, if the user is with the platform, the platform is generally unarmed, or in the arming-in-progress mode. No server action or user-carried device action is taken, if the user is present, and the device is not armed.

If the user may be away from the platform, and the platform is armed, but there is no threat detected, no server action is taken, but the user may optionally be alerted that he or she is out of range of the platform.

If the user is away, and a threat is detected, the platform mode moves to suspecting mode, to protect data and send alerts. The server is capable of tracking the pings of the platform. If there is significant movement, or the platform stops sending pings, the server is capable of alerting the user, or the controlled exit point, or another authorized target, that the platform is threatened. The user-carried device may alert, or not, depending on policy.

Figure 12:
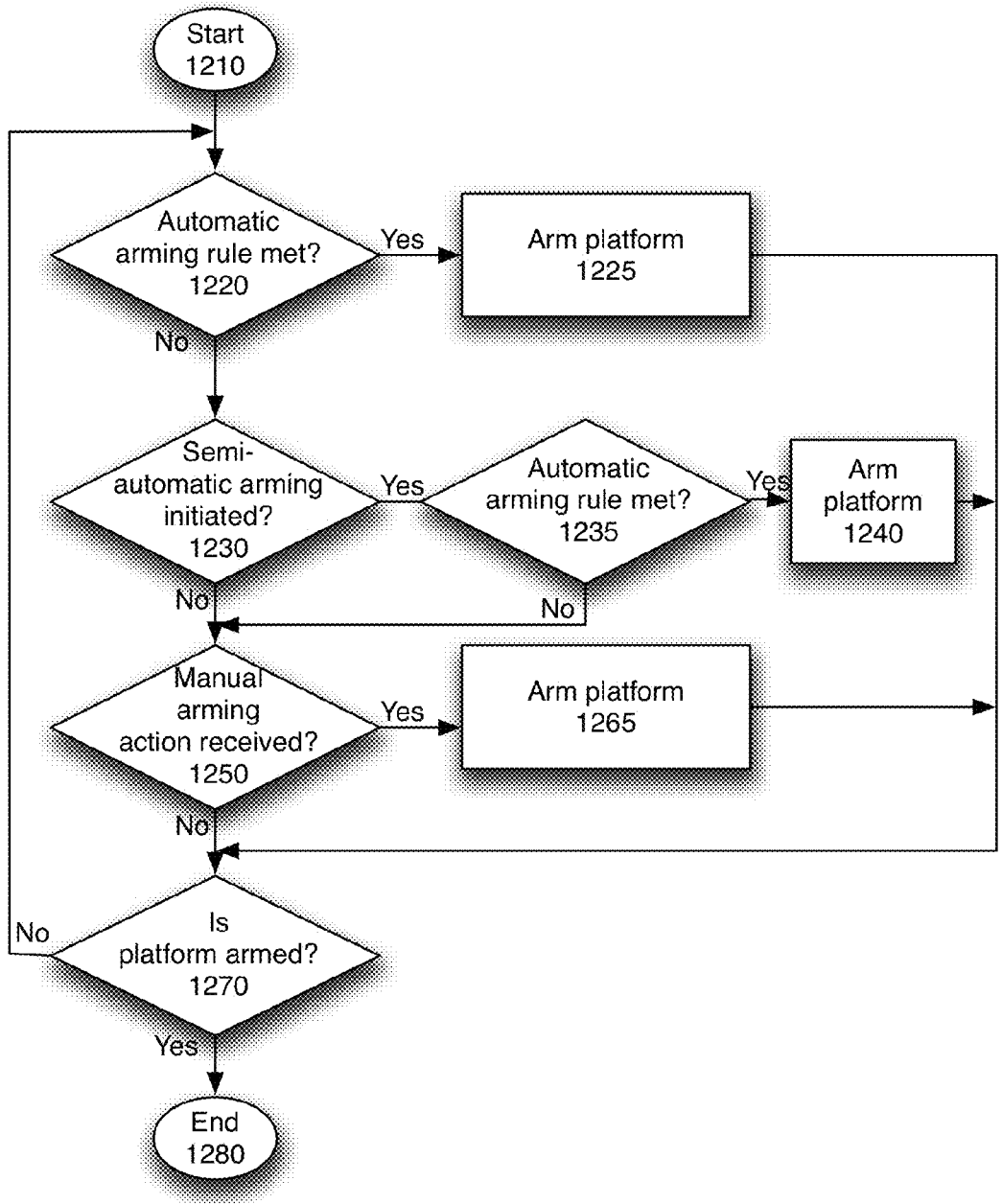
FIG. 12 is a flowchart of one embodiment of arming the system.

FIG. 12 is a flowchart of one embodiment of arming the system. The process starts at block 1210. In one embodiment, the system always monitors for arming indications, when it is powered. In one embodiment, the process therefore starts whenever the system is powered, and not yet armed.

At block 1220, the process determines whether the automatic arming policy has been met. Automatic arming sets certain policies that cause the device to be armed. FIG. 13 shows some of the possible automatic arming policies. They may include loss of Bluetooth proximity, loss of user via camera, closing of the lid, device movement, device idleness, location, time of day, or other preset automatic triggers to arming. In one embodiment, the system may have no automatic arming policies in place. In that instance, the automatic arming policy cannot be met.

Returning to FIG. 12, if the system determines that the automatic arming policy has been met, at block 1225, the platform is armed. The process then continues to block 1270. At block 1270, the process confirms whether the platform is armed. If so, the monitoring for arming is ended, at block 1280. In one embodiment, this includes turning off sensors or other devices that are powered in order to enable detection of an arming action. Once the platform is armed, only those elements that are needed for disarming and detecting suspicion triggers remain powered.

If the automatic arming rule was missing, or was not met, the process continues to block 1230. At block 1230, the process determines whether a semi-automatic arming has been initiated. Semi-automatic arming uses a first manual initiation, and then an automatic arming rule. For example, semi-automatic arming may occur if the user initiates pairing with a Bluetooth device, sets a switch, or otherwise initializes the arming system. Once the initialization takes place, the platform is automatically armed when a certain condition occurs. These conditions may be the ones listed in FIG. 13. The initial manual switch may be one of those listed under manual arming in FIG. 13, or another. If semi-automatic arming is initiated at block 1230, the process continues to block 1235.

At block 1235, the process determines whether the automatic arming rule is met. If so, the platform is armed at block 1240. The process then continues to block 1270, where the system confirms that the platform is armed, and exists the arming cycle. If the automatic arming rule is not met, at block 1235, the process continues to block 1250. In another embodiment, once the semi-automatic arming is initiated, the process only checks on whether the automatic arming rule associated with the semi-automatic arming is met (e.g. the process loops around block 1235 until either the rule is met, or the semi-automatic arming is disarmed.

If the semi-automatic arming is not initiated, or not enabled in the system, the process continues to block 1250. At block 1250, the process determines whether a manual arming command is received. The manual arming command may be one of the forms listed in FIG. 13, or another action by the user to initiate arming. If the manual arming action was received, at block 1265 the platform is armed. The process then continues to block 1270, to determine whether the platform is armed, and exit the arming loop, if it is. If no manual arming action is received, at block 1270 the process determines whether the platform is armed. If the platform is armed, the process ends at block 1280. If the platform is not armed, the process returns to block 1220, to continue monitoring for an arming.

In one embodiment, the specific arming rules may be set by the user. In one embodiment, there may be a default setting for the system. For example, the default setting may be that the platform is automatically armed after 5 minutes idle, when a user carrying a paired device leaves, when the platform is disconnected from a network connection, etc. The user may modify these settings, when the platform is disarmed. In one embodiment, an administrator may also modify these settings. In one embodiment, for a corporate-owned platform, the administrator may set default arming settings that cannot be changed by the user. In one embodiment, for a personal computer, the user may disable administrator access to the settings.

Figure 14:
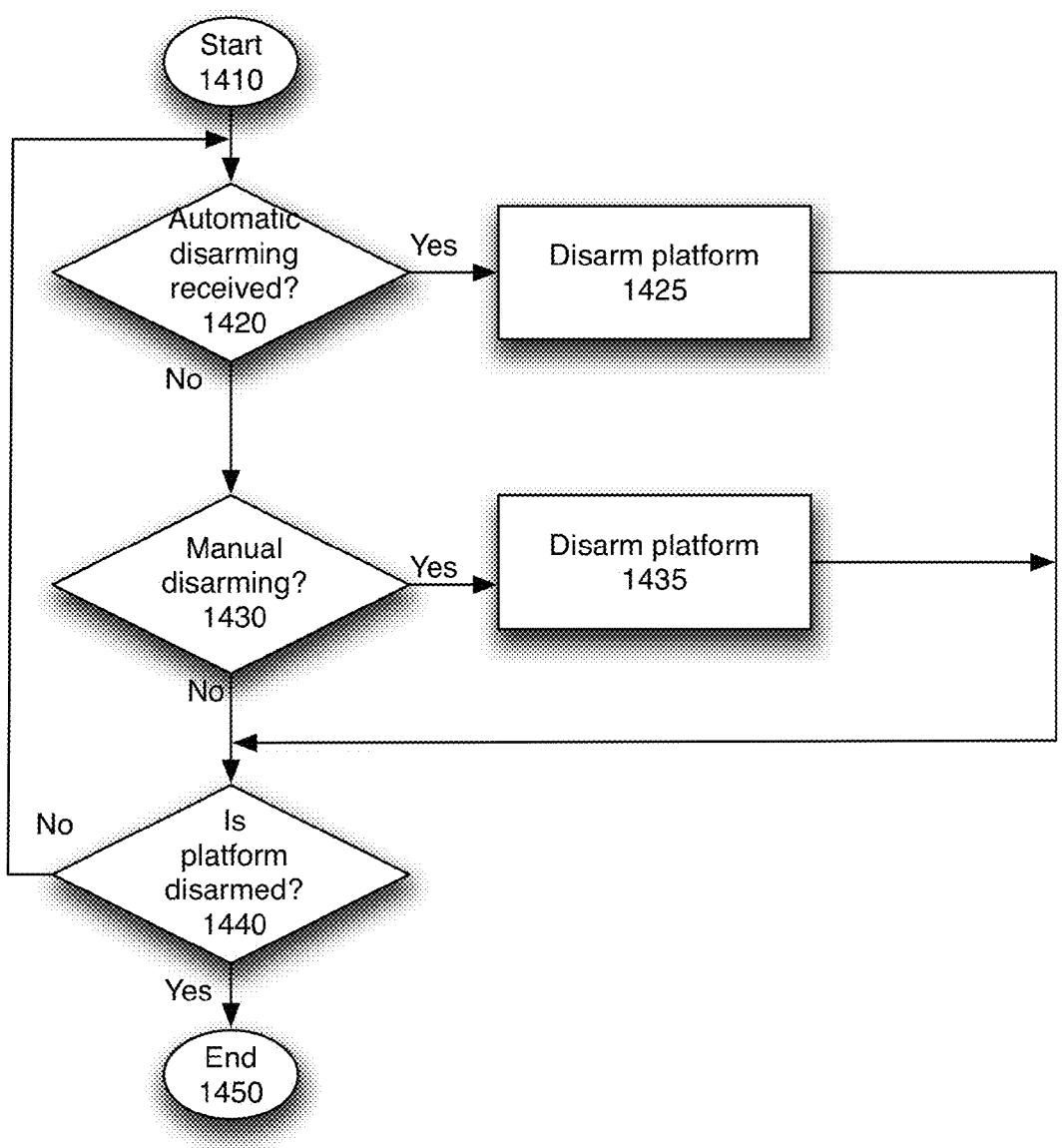
FIG. 14 is a flowchart of one embodiment of disarming the protection system.

FIG. 14 is a flowchart of one embodiment of disarming the protection system. The process starts at block 1410. In one embodiment, this process is active whenever the platform is armed. In one embodiment, this is active in multiple power states, e.g. when the platform is in the ON or Sleep states. In one embodiment, this includes powering one or more sensors, detectors, or devices that may receive a disarming command.

At block 1420, the process determines whether an automatic disarming signal has been received. Some examples of automatic disarming signals are listed in FIG. 15. In one embodiment, the user may disable the automatic disarming. If the automatic disarming is disabled, there would be no conditions that would automatically disarm the platform. In one embodiment, the system powers those elements that are associated with an automatic disarming command. For example, if there is a paired Bluetooth device, and the Bluetooth automatic disarming is enabled, the system would power the Bluetooth pairing when the platform was armed, even in a reduced power state.

If the automatic disarming signal has been received, the platform is disarmed at block 1425. Disarming the platform may result in enabling keyboard input, decrypting data, or otherwise making the platform ready to interact with the user.

The process then continues to block 1440, where the process verifies that the platform is disarmed. If so, the process ends at block 1450. At this point, the system switches over to enable the sensors associated with arming the platform, as discussed above with respect to FIG. 12.

If no automatic disarming was received, at block 1430 the process determines whether a manual disarming command was received. Some examples of manual disarming indicators are shown in FIG. 15. In general, disarming requires the demonstration that the authorized user has control of the platform. Therefore, tapping by a Near Field Communication device (e.g., user's badge or phone), or biometrics such as the user's image, fingerprint, voice, etc. may be used, as well as passwords/movements, which would only be known by the authorized user.

If the manual disarming command was received, at block 1435 the platform is disarmed.

In any case, the process determines at block 1440 that the platform is disarmed. If it is disarmed, the process ends at block 1450. If the platform is not disarmed, the process returns to block 1420 to continue monitoring for automatic and manual disarming commands.

Figure 16:
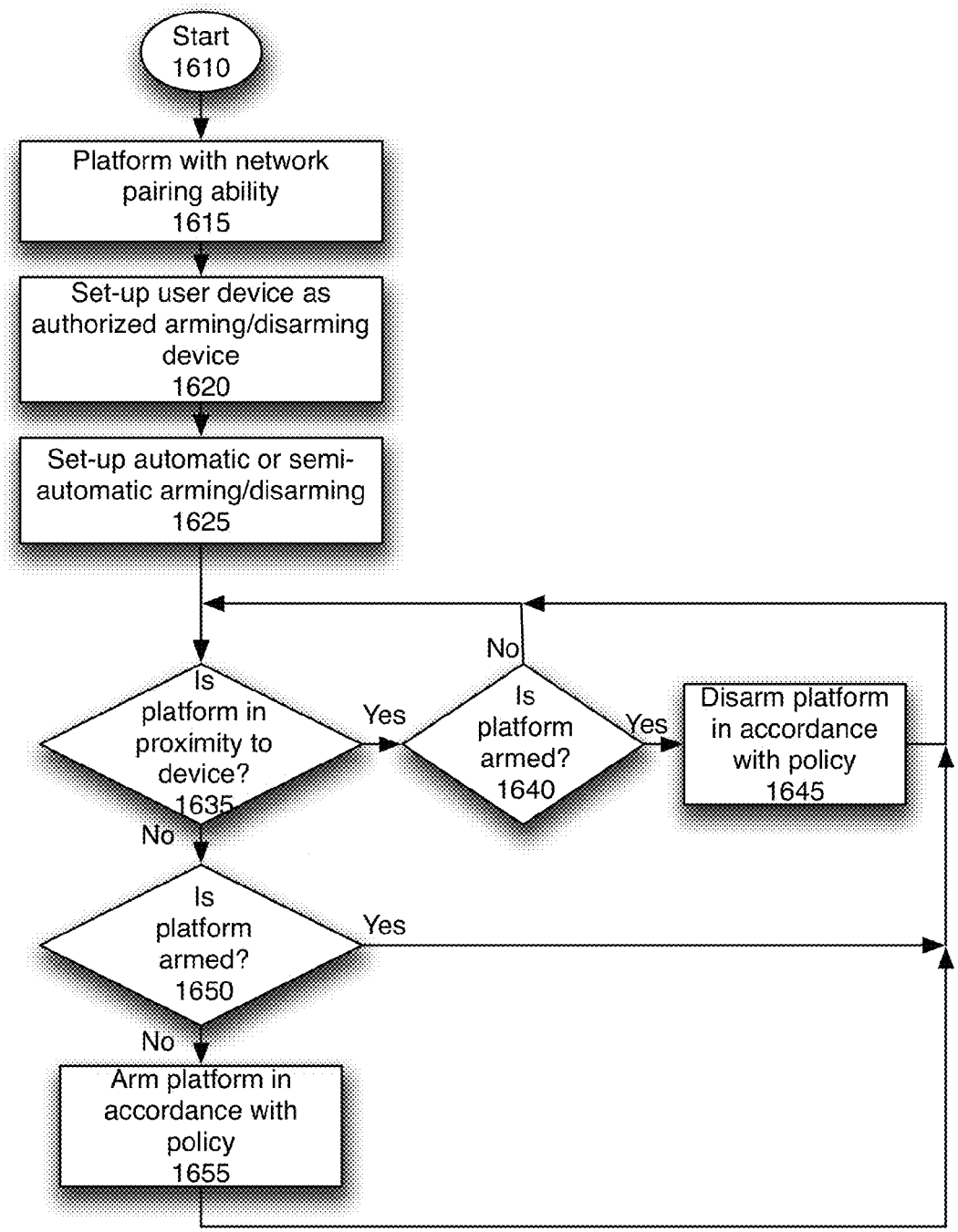
FIG. 16 is a flowchart of one embodiment of using a user-carried device, for automatic network-based arming and disarming.

FIG. 16 is a flowchart of one embodiment of pairing a device, for network-based arming and disarming. The process starts at block 1610. At block 1615, a user acquires a platform including a Bluetooth or other local area network connection ability. In one embodiment, the network connection format is a Bluetooth Pairing.

At block 1620, the user sets up another network-enabled device as a paired device with the platform. In one embodiment, any device that is capable of pairing with a Bluetooth enabled platform may be used. In one embodiment, such a device may include a mobile telephone, a Bluetooth capable wireless headset, a badge including Bluetooth capabilities, or any other device.

At block 1625, the automatic or semi-automatic arming/disarming is set up with the paired user device. In one embodiment, the user may set the specifics of the pairing during this set-up. The specifics may include timing, and other limitations. For example, in an extremely secure environment the user may set that the platform should be armed immediately when connection with the paired device is lost. In a less secure environment, the user may prefer to set a short period prior to arming the platform, to remove the potential time delays of having the platform arm and disarm, for momentary loss of connectivity.

If the pairing is active, the process at block 1635 determines whether the platform is in proximity to the device. If the platform is in proximity to the device, at block 1640 the process determines whether the platform is armed. If the platform is armed, at block 1645, the platform is disarmed. Since the device is in proximity to the platform, the user is considered to be present. Therefore, the platform is disarmed. The process then returns to block 1635, to check if the platform is still in proximity with the user-carried device.

If the platform is not in proximity to the paired device, at block 1635, the process continues to block 1650. At block 1650, the process determines whether the platform is armed. If the platform is unarmed, at block 1655 the platform is armed. Since the device is absent, the platform assumes that the user is also absent. Therefore, the platform is armed. The process then continues to block 1635, to check if the platform is still not in proximity to the user-carried device. If the platform is armed the process continues directly to block 1635.

In this way, the system simply arms and unarms the platform as the paired device is in proximity to the platform or not. In one embodiment, the platform considers the device to be in proximity when the Bluetooth pairing takes place. In one embodiment, the Bluetooth system in the platform is set up with a radius limitation. While Bluetooth networks can range as far as 10 meters, the system can be set up to limit the distance for which pairing is available to a distance that is acceptable. Furthermore, in one embodiment, the system uses later versions of the Bluetooth protocol that requires encryption, and prevents XOR attacks to obtain the pairing key.

Figure 17:
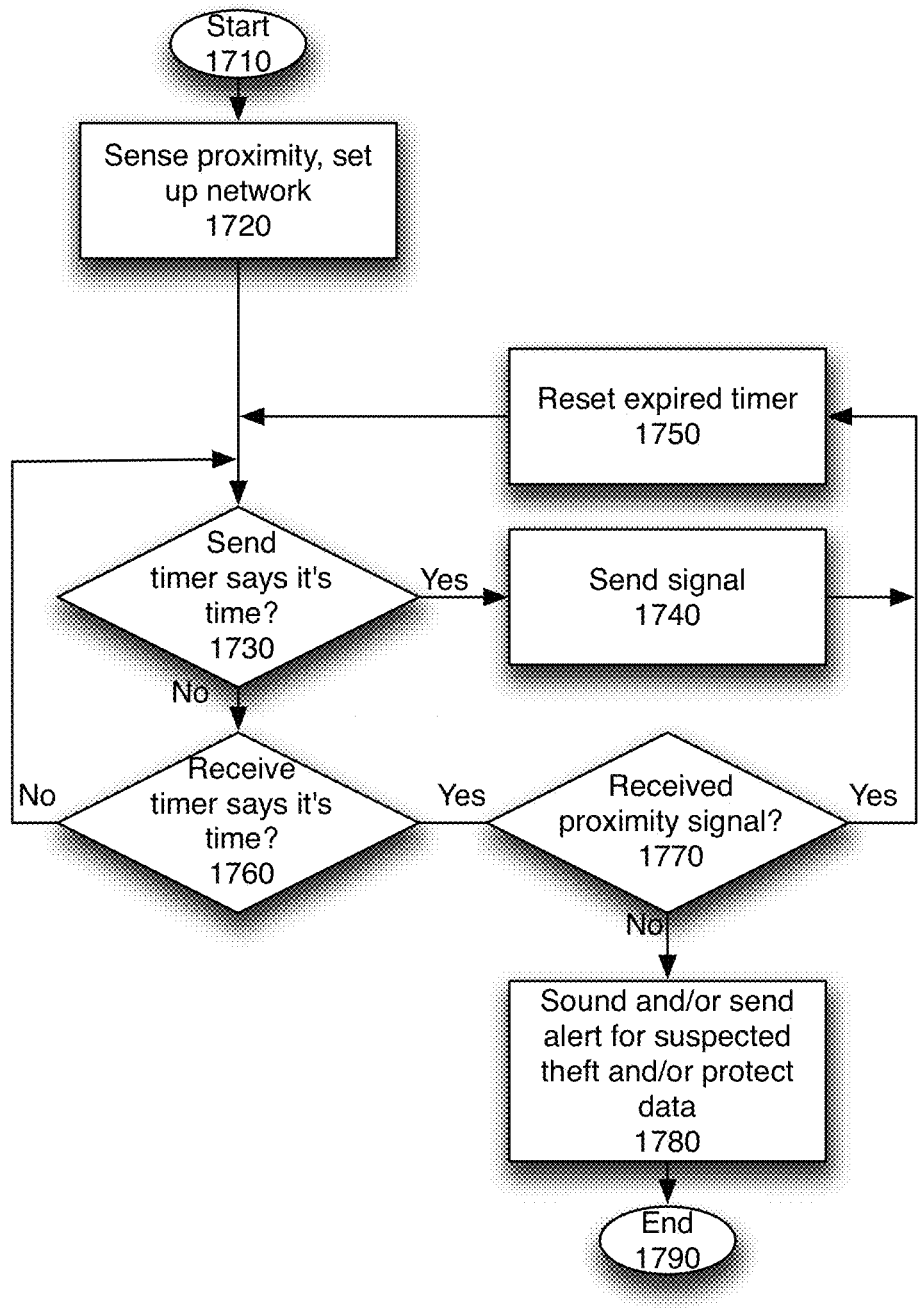
FIG. 17 is a flowchart of one embodiment of using two-way Bluetooth enabled devices for arming/disarming and notification services.

FIG. 17 is a flowchart of one embodiment of using two-way Bluetooth enabled devices for arming/disarming and notification services. In addition to the one-way notification described above with respect to FIG. 16, two-way communication may also be set up. The process starts at block 1710. This process starts when there is an active two-way Bluetooth system set up, with a paired device.

At block 1720, the platform and the device sense the proximity and set up the paired network. This opens up a communication channel between the platform and the device. The below process occurs both on the platform and the device. In one embodiment, this requires a separate application on the paired device.

At block 1730, the process determines whether the send timer says it is time to send a ping to the device. If so, at block 1740 the platform sends a ping to the device. The process then continues to block 1750, where the ping sending timer is reset. The process then returns to block 1730, to determine whether it is time to send another ping.

If it is not yet time to send a ping to the platform, the process, at block 1760, determines whether the platform should have received a ping from the device. If it is not yet time, the process loops back to continue testing whether it is time to send, or receive a ping, at block 1730.

If it is time to have received a ping, at block 1770 the process determines whether a ping indicating continued proximity has been received from the device. If a proximity signal been received, the process continues to block 1750, to reset the receiving timer.

If no proximity signal has been received, at block 1780 an alert is sounded and/or sent. The alert is sent, in one embodiment, to the paired device, to alert the user that the device is now out of proximity range. In one embodiment, the alert is sent via a wireless connection rather than via a Bluetooth pairing connection. In one embodiment, if the platform is in the arming-in-progress mode, the platform may additionally move to the Armed mode. This protects the data on the platform, and starts monitoring for other indicators of potential theft.

The above process' mirror takes place in the device. This paired two-way Bluetooth connection enables a user to track the Bluetooth device and the platform, and have bidirectional protection. In one embodiment, this process runs in parallel with the arming/disarming process described above.

Figure 18:
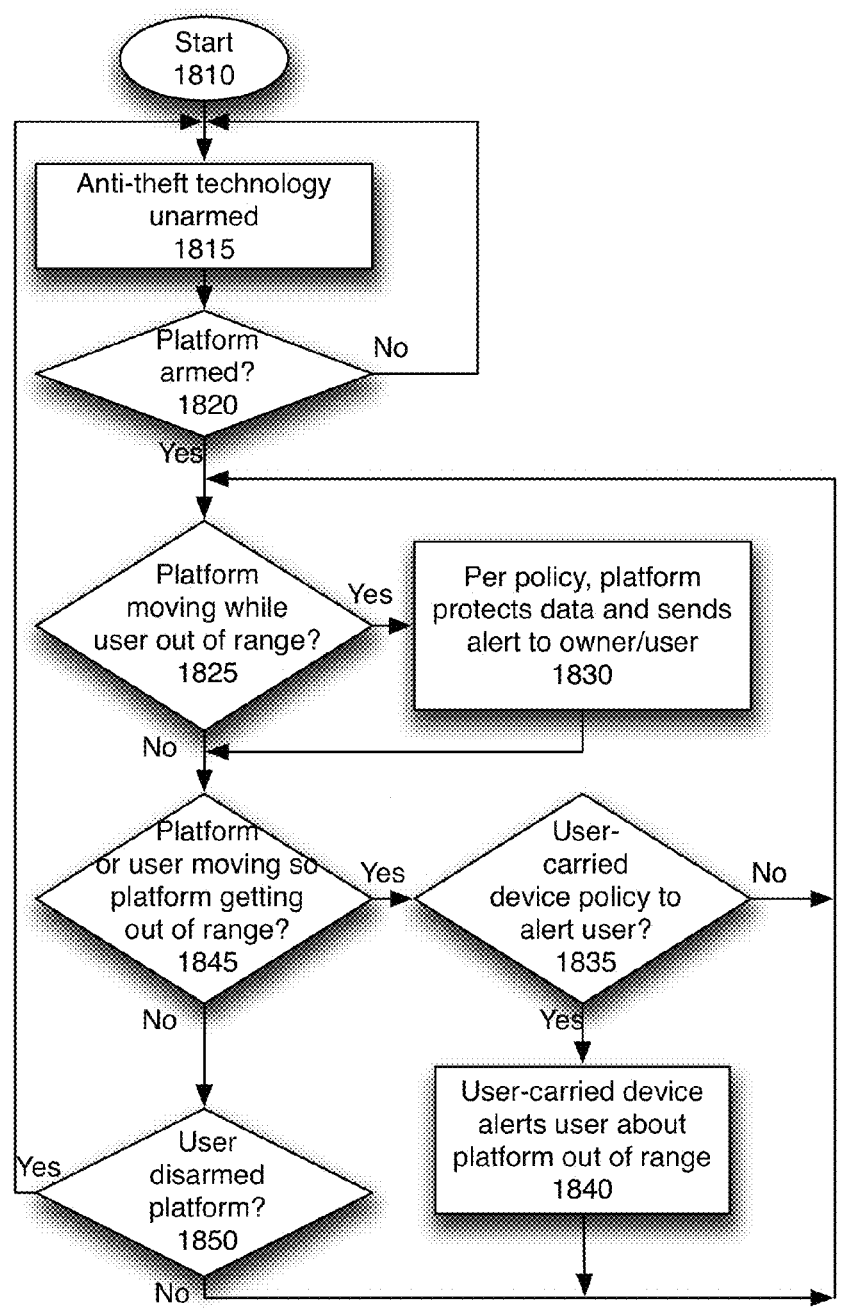
FIG. 18 is a flowchart of one embodiment of proximity-based arming and disarming, when proximity is further coupled with motion data.

FIG. 18 is a flowchart of one embodiment of proximity-based arming and disarming, when proximity is further coupled with motion data. In one embodiment, the system reacts differently when the platform is moving, and when the platform is not moving. The process starts at block 1810.

At block 1815, the anti-theft technology is unarmed. At block 1820, the process determines whether the user has armed the platform, or the platform has been armed based on the automatic or semi-automatic settings. If not, the process continues to monitor, returning to block 1815.

If the platform is armed, the process continues to block 1825. At block 1825, the process determines whether the platform is moving while the user's device is out of range. If the platform is moving while the user's device is outside of its range, the process continues to block 1830. At block 1830, per policy, in one embodiment, the platform protects the data, and sends an alert to the owner, user, and/or server associated with the platform. In one embodiment, the data may already be protected, in which case only an alert is sent. The process then continues to block 1845.

If the platform is not moving, while the user device is out of range, at block 1825, the process continues to block 1845. At block 1845, the process determines whether the user or platform are moving such that the platform is getting out of the user range. If so, the process continues to block 1835, to determine whether the user-carried device has a policy that it should alert the user via an alarm that he or she is moving outside the range of the platform. In one embodiment, the alarm may be sounded under limited circumstances. For example, the user may sound an alarm that is only sent when the platform is initially moving along with the paired device, and then the two move apart. In one embodiment, if the platform becomes stationary for at least a short period prior to the platform and device moving apart, the user may not wish an alert. This is likely to occur, for example, at work where the user would periodically move away from their laptop (platform) carrying their mobile phone (paired device). In contrast, it is relatively unlikely that the user would be walking with the platform, and suddenly walk away from it.

If the setting is to alert the user via an alarm, at block 1835, the device sounds the alarm to the user, at block 1840, due to Bluetooth proximity loss.

If the user is not moving out of range, as determined at block 1845, the process at block 1850 determines whether the user has disarmed the platform. If the user has not disarmed the platform, the process continues to block 1825 to continue monitoring the platform's movement and whether the user device is in range. If the user has disarmed the platform, the process returns to block 1815, leaving the anti-theft technology unarmed.

Figure 19:
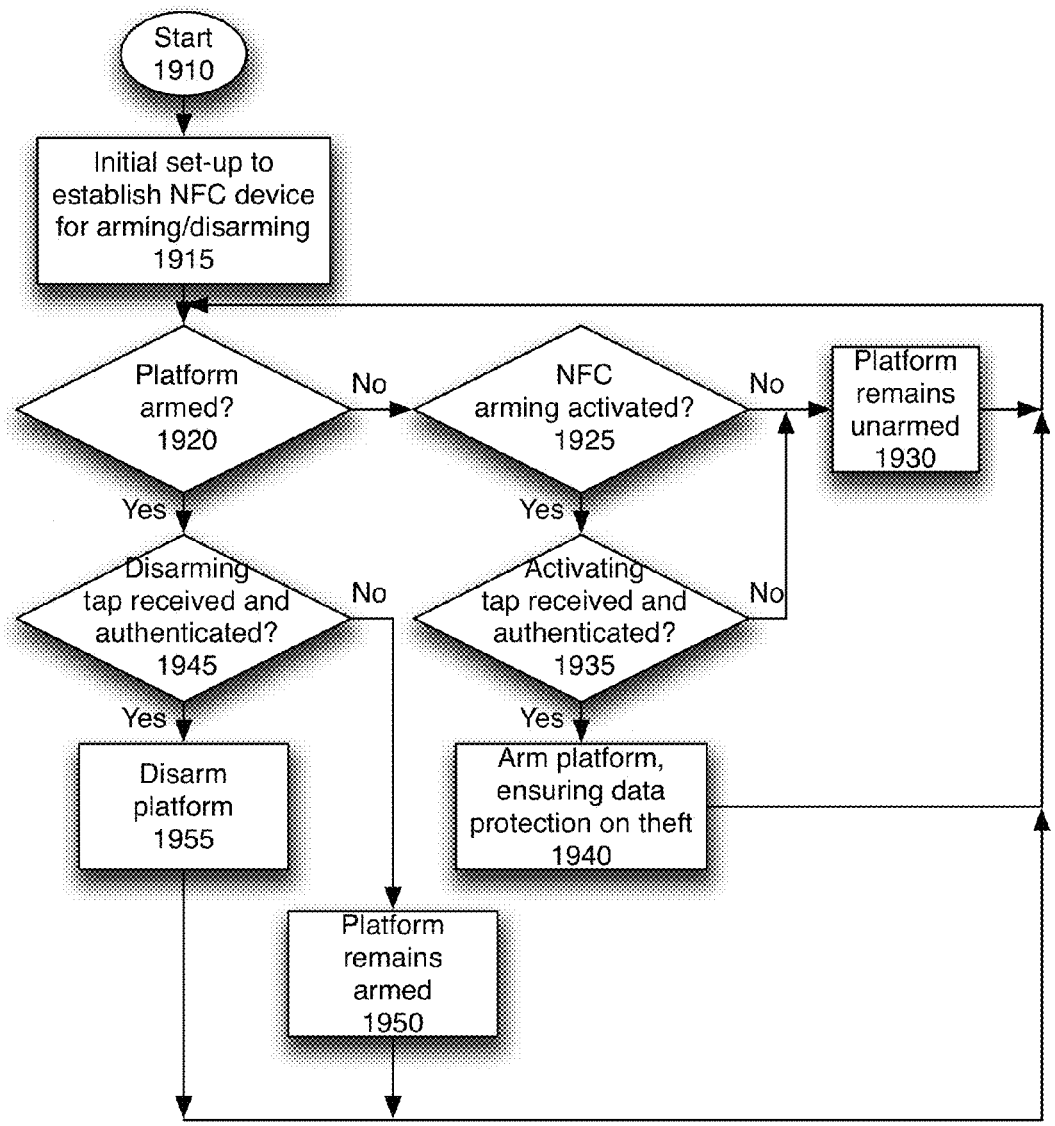
FIG. 19 is a flowchart of one embodiment of using Near Field Communications for arming and disarming the system.

FIG. 19 is a flowchart of one embodiment of using Near Field Communications for arming and disarming the system. The process starts at block 1910. In one embodiment, the process starts with a platform including a Near Field Communications reader.

At block 1915, the system is initially set up to establish an NFC chip-containing device for arming/disarming. In one embodiment, the NFC chip may be in the user's badge, in the user's mobile telephone, a tag that may be attached to a keychain, on a sticker that may be attached to something the user habitually carries such as a badge or telephone.

At block 1920, the process determines whether the platform is armed. If the platform is not armed, at block 1925, the process determines whether NFC arming is activated. In one embodiment, when the arming process is semi-automatic, the user needs to initialize the NFC-based arming process. If the NFC arming is not activated, the platform remains unarmed, at block 1930. The process then returns to block 1920, to continue looping through this process.

If the NFC arming is activated, the process continues to block 1935. At block 1935, the process determines whether the activating tap with the NFC-enabled device has been received, and authenticated. In one embodiment, the system uses a pattern of taps (e.g. tap-tap-tap in a particular cadence). In another embodiment, a plurality of timed proximities (e.g. tapping or waving the NFC chip-enabled object, may be the activating tap. In another embodiment, holding the NFC-chip-enabled object in proximity is sufficient. Authentication includes checking credentials passed by the NFC device. The credentials must be those registered during the initial set-up, to enable the use of the NFC device for arming and disarming. If the activating tap was not received or not successfully authenticated, the process continues to block 1930, and the platform remains unprotected.

If the activating tap is received and authenticated, at block 1940, the platform is armed, and the data is guaranteed to be protected in case of theft suspicion. Once the platform is armed, it is disarmed by an authorized user or administrator disarming the platform.

The process then returns to block 1920 to verify whether the platform is armed.

If, at block 1920, the process found that the platform was armed, it continues to block 1945. At block 1945, the process determines whether a disarming tap was received and authenticated. If a disarming tap was received and authenticated, at block 1955 the platform is disarmed. If no disarming tap was received, or the authentication failed, the platform remains armed, at block 1950. The process then returns to block 1920. For disarming, there may be a preset pattern of taps. In one embodiment, the NFC reader "identifies" the taps as a plurality of proximity detections within a preset period. For example, the pattern may be proximity—no proximity—proximity within a one second period. In this way, merely taking the NFC-chip enabled device is insufficient.

Note that although this process describes only NFC-based arming and disarming, one of skill in the art understands that the methods of manual, and various automatic and semi-automatic methods of arming may co-exist.

Figure 20:
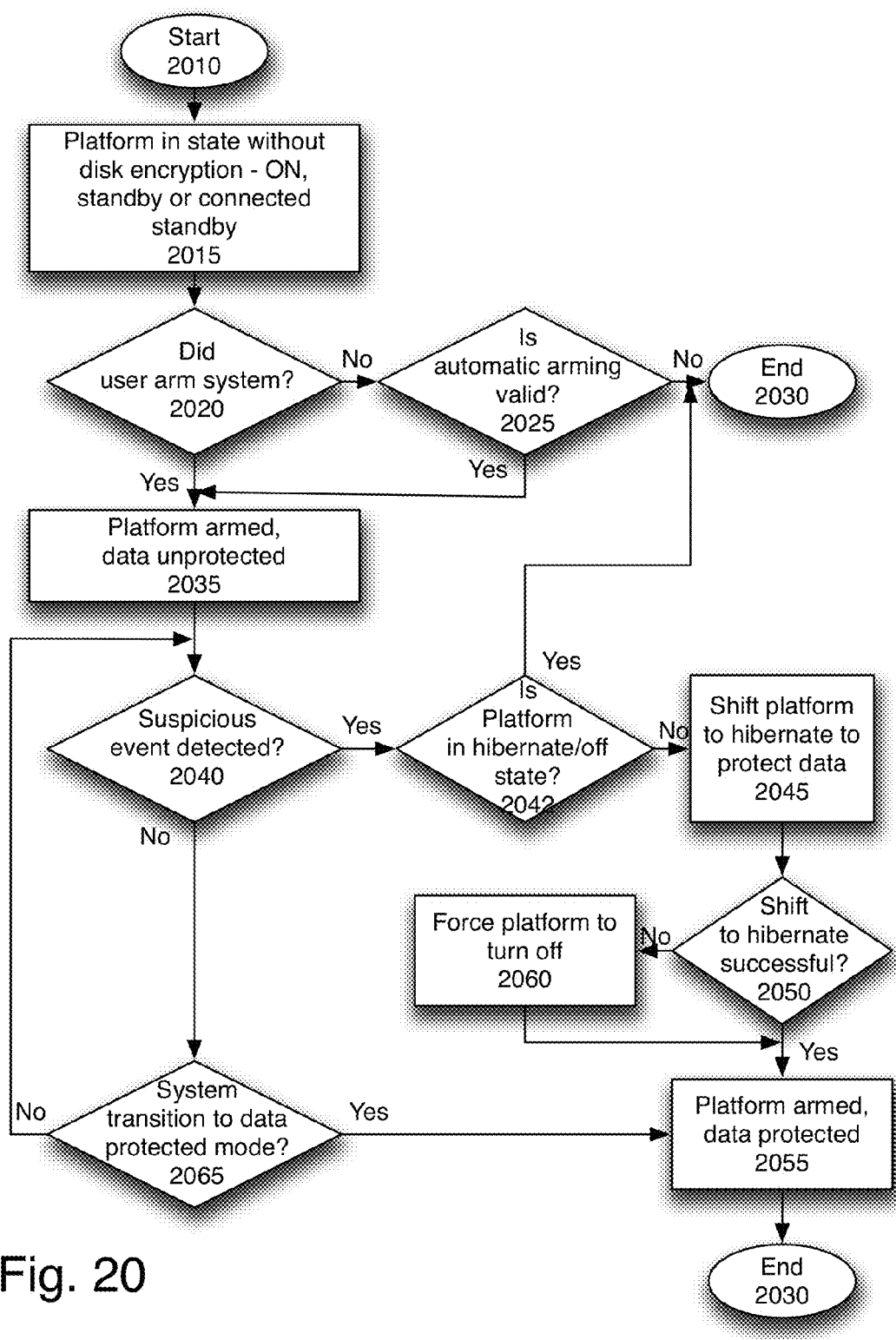
FIG. 20 is a flowchart of one embodiment of power operations used to protect the system's data-at-rest.

FIG. 20 is a flowchart of one embodiment of power management including triggers data protection of the system. The example here describes four power states: ON, standby/connected standby, hibernate, and OFF. One of skill in the art would understand that these are merely four exemplary power consumption levels, regardless of their naming scheme. ON is fully powered (though not all aspects of a platform need to be powered for it to be ON), standby or connected standby is a lower power state, and hibernate a lower power state yet, but above OFF. In one embodiment, although four separate states are described, fewer states may be implemented on a platform. The process starts at block 2010.

At block 2015, the platform is in a power state without disk encryption, such as standby or connected standby. The platform may also be in an ON state, in one embodiment.

At block 2020, the process determines whether the user has armed the system. In one embodiment, the user may manually arm the system. If the user has not armed the system, the process at block 2025 determines whether the criteria for automatic arming are met. If the criteria are not met, the process ends at 2030.

If the automatic arming criteria are met, the process continues to block 2035. If at block 2020 the user armed the system, the process continues to block 2035 as well.

At block 2035, the platform is armed, but the data may be unprotected.

At block 2040, the process determines whether a suspicious event was detected. If no suspicious event was detected, the process continues to block 2065. At block 2065, the process determines whether the system transitioned to data protected state. This may occur because of user action. If the system is in a data protected state, the process proceeds to block 2055 where the data is protected state. In one embodiment, the process loops back to block 2040 to continue monitoring for suspicious events, in order to perform additional security actions in case of suspected platform theft.

If at block 2040 a suspicious event was detected, the process continues to block 2042. At block 2042, the process determines whether the platform is already in a hibernate or OFF state. If so, the process ends at block 2030, since the platform is protected. If the process is not in the hibernate or off state, the process continues to block 2045, wherein the platform attempts to move to the hibernate state. In one embodiment, when the system is in hibernate state, authentication is required to access the platform, to complete moving the platform from hibernate to the ON state, and have access to the data. In one embodiment, this means the data is encrypted. This slows down access to the platform after it is turned on, and thus it is not optimal for standby. It also prevents automatic wakes of the platform in order to download information such as e-mails, and therefore it breaks Connected Standby. While the system is armed, at block 2035, no manual disarming or decryption is needed, in one embodiment.

At block 2050, the process determines whether the shift to hibernate was successful. If so, at block 2055 the platform is hibernating and therefore the data is protected. Once the data is protected, the process ends at block 2030. In one embodiment, the process continues to monitor for suspicious theft events for other security actions, at block 2040. In one embodiment, if the system is monitoring for suspicious events in the hibernate state, the system may send out an alert or perform another action when a suspicious theft event is detected.

If the shift to hibernation was not successful, as determined at block 2050, the process forces the platform to turn off at block 2060. This forced turning off is designed such that no software can interrupt the process. Once the platform is off, the data is only accessible with a password and thus the platform is armed and the data protected, at block 2055. The process then ends at block 2030. In one embodiment, the process continues to monitor for suspicious theft events for other security actions, at block 2040. In this way, the system allows a protected standby state, without imposing the additional overhead of requiring a password to access the data if no suspicious events were detected, and without breaking Connected Standby usages. This enables a layer of protection that is transparent to the user unless a suspicious event is detected.

Figure 21:
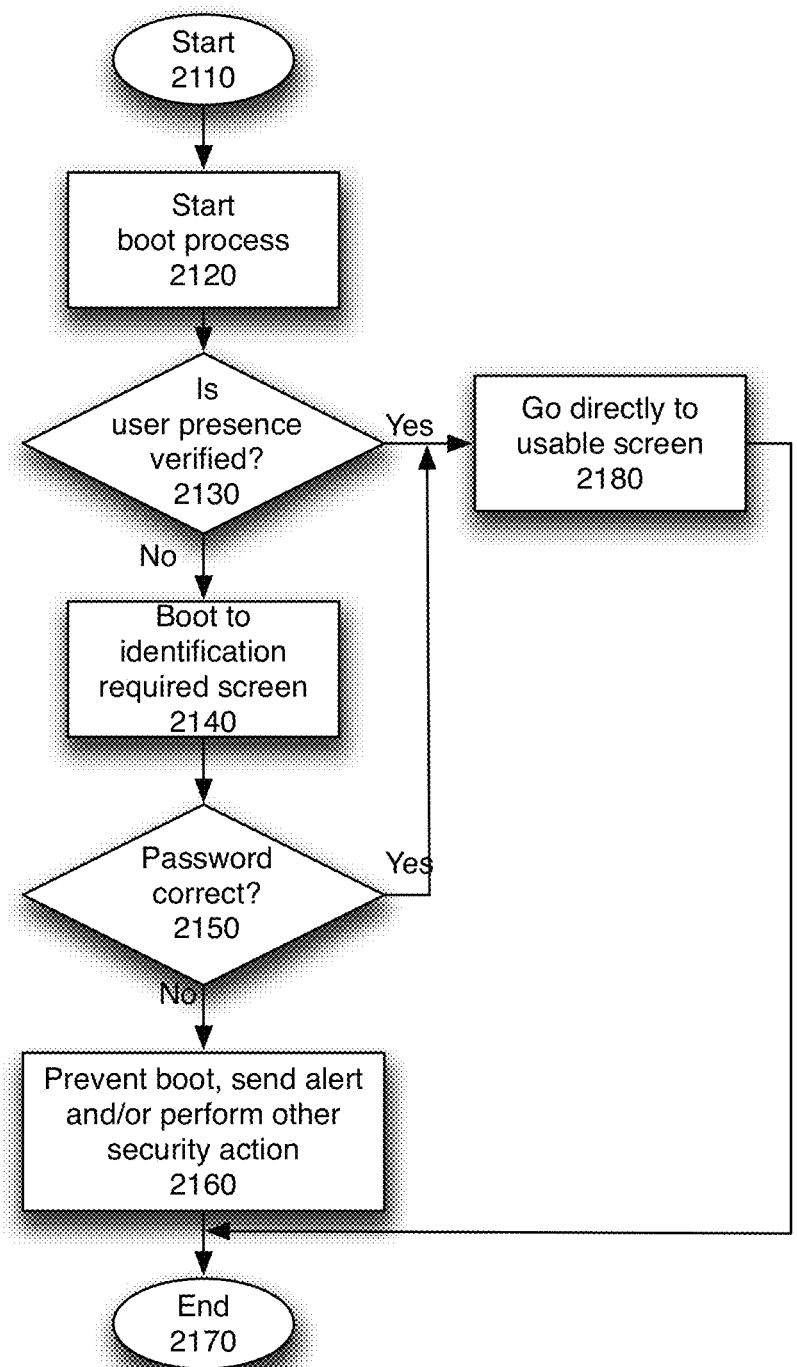
FIG. 21 is a flowchart of one embodiment of transparent boot/resume to the user, which is secure in face of a thief or unauthorized user.

FIG. 21 is a flowchart of one embodiment of transparent boot/resume. In general, computer systems do not require the entry of a password, when a mobile system is resumed from a Standby or Connected Standby state. This process, in one embodiment, allows the system to force a non-authorized user to enter a password on resume, even if the user himself is never prompted for that password (assuming the user is away when the non-authorized user attempts access). This process, in one embodiment, also allows the system to boot from a state normally requiring manual entry of a password, without prompting the authorized user for the password. The process starts at block 2110. In one embodiment, this process starts when a user turns on a computer, or initiates the booting process. For simplicity, the term "booting" here refers to moving from a reduced power state to an ON state, regardless of whether BIOS boot is required.

At block 2120, the system starts the booting process. If the platform is a computer system, in one embodiment the CPU (central processing unit, or processor) initializes itself. Since the anti-theft system is operational in all power modes, it is able to reach a conclusion about user proximity even before system boot starts.

At block 2130, user presence is verified. In one embodiment, this determination may be based on user presence monitoring that occurred prior to system boot. User presence may be verified based on proximity of a paired Bluetooth or other network device, a visual identification based on camera input (e.g. identifying the user at the platform), or another presence identification.

If the user presence is verified, at block 2180, the process goes directly to a usable screen. This means the system skips the necessity to enter a password. This increases usability and prevents adverse effects to usability of the platform for the authorized user. The process then ends at block 2170.

If the user's presence is not verified, the process continues to block 2140. At block 2140, the process finishes booting to the password screen. In one embodiment, the password requirement may be modified to enable the use of an NFC, biometric, or other authentication mechanism.

At block 2150, after the identification/password is received the system verifies whether it is accurate. If so, the process continues to block 2180 to provide a usable screen, since an authorized user's presence has been validated.

If the password is incorrect, or does not reflect the presence of an authorized user, the process continues to block 2160. In one embodiment, this occurs only after providing a plurality of chance to enter the proper password/ID.

At block 2160, in one embodiment an alert is sent to the user, or another security action is taken. In another embodiment, no action is taken except preventing the platform boot. The security action may alert the user, send an alert to a security server, shut down the computer, or in one embodiment, authorize a kill pill (e.g. make the computer unusable.) The process then ends at block 2170.

Figure 22:
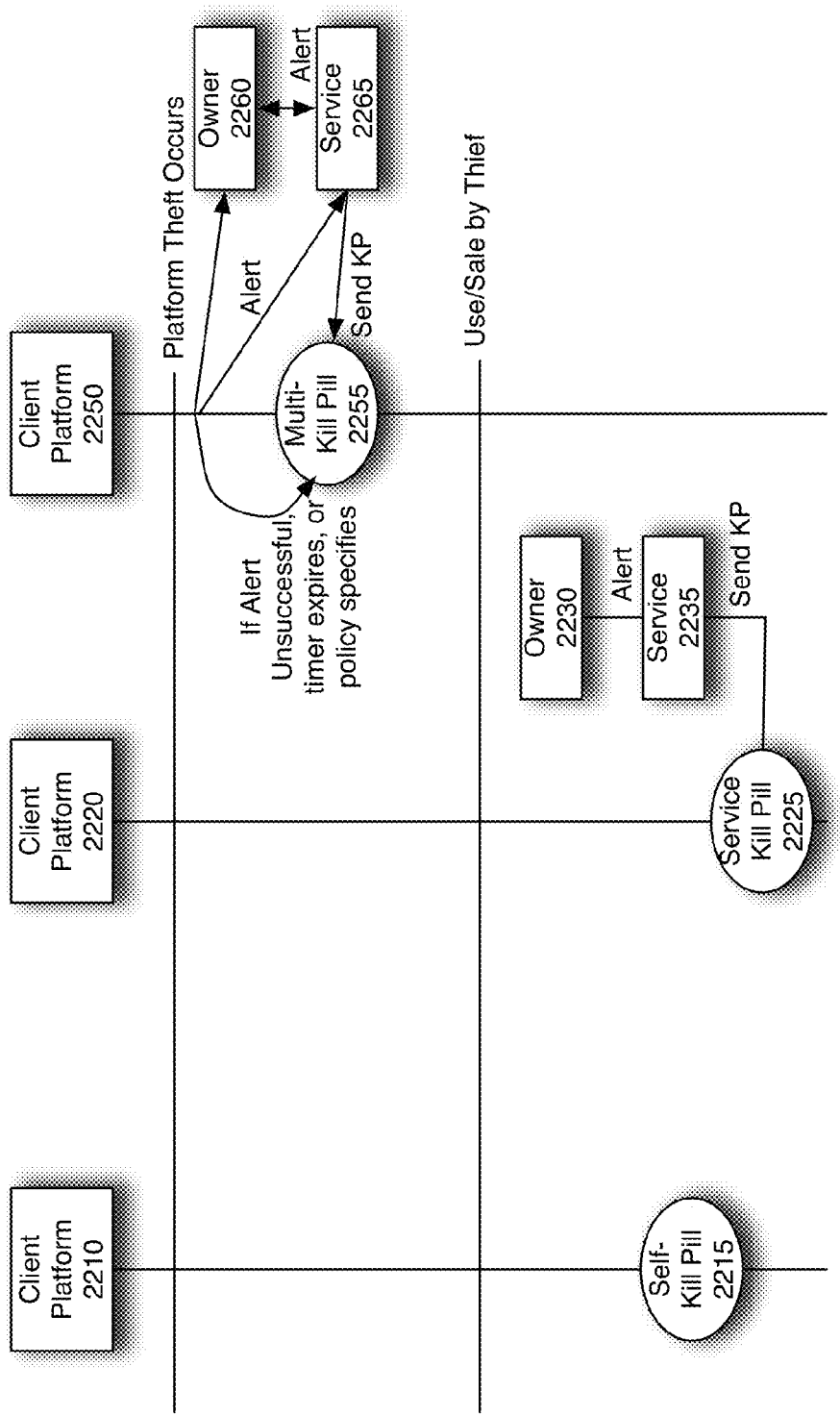
FIG. 22 is a diagram of one embodiment of a multi-kill pill system.

FIG. 22 is a diagram of one embodiment of a multi-kill pill system. The diagram shows three possible kill-pill implementations. A kill-pill is a method of making a computer-system platform unusable, or its data inaccessible or erased. It is designed to be applied when the platform is stolen or lost, and the value of the data on the platform is higher than the value of the platform itself.

The first example has a client platform 2210, and a self-kill pill 2215. The self-kill pill is invoked when there is a suspicion of theft, and no user action has occurred in time. In general, the time before invoking the self-kill pill may be a few hours to a few days. This means that the thief may have a chance to use or sell the platform prior to the kill pill being invoked.

The second example has the client platform 2220 and a service kill pill 2225. The service kill pill 2225 enables an owner 2230 to notify a service 2235, to send a service kill pill 2225. However, since this requires notification, the owner 2230 has to become aware of the theft, then notify the service 2235 and await the service's initiation of the kill pill 2225. Therefore, this method too may provide enough time for a thief to use or sell the platform before the kill pill is activated.

The third example is a multi-kill pill 2255. The client platform 2250 is protected by a kill pill 2255 which can be invoked in a multiplicity of ways. In one embodiment, three options are available: a self kill option, alerting of a kill pill service to remotely invoke the kill pill, and a notification of the owner, who can then engage the service 2265 to invoke the kill pill 2255. Because this multi-pronged approach enables a rapid response the thief cannot sell the platform quickly enough, which means that the solution has an increased deterrence against theft, compared to a kill-pill solution that does not have an immediate reaction element.

In one embodiment, when the client platform 2250 identifies a theft suspicion, an alert is sent out to the owner 2260, and the service 2265. If the owner 2260 responds, indicating there is no theft, the process ends. But if the alert is unsuccessful (not properly received by the owner, or no response received), the system initiates the self-kill pill. Alternatively, the service 2265 may send the kill pill notice, in response to user 2260 authorization.

In one embodiment, since the immediate anti-theft reaction technology operates in low power states as well, it would not help the thief to keep the platform in a low power state in order to delay invocation of the kill-pill.

Figure 23:
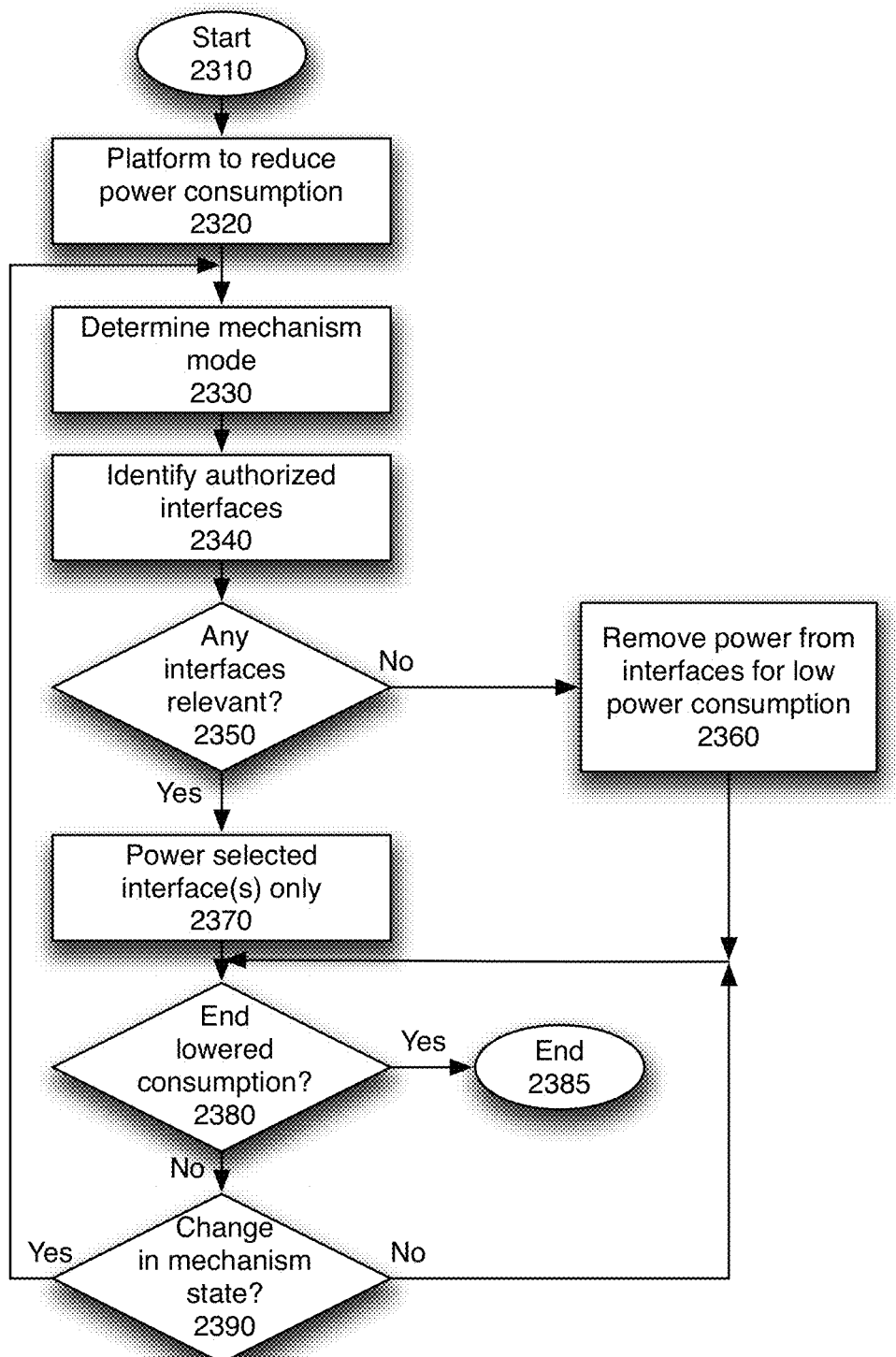
FIG. 23 is a flowchart of one embodiment of power management of the anti-theft mechanism's components.

FIG. 23 is a flowchart of one embodiment of power management of the anti-theft mechanism's components. The process starts at block 2310. At block 2320, the system enters a reduced power consumption status. In one embodiment, this occurs whenever the platform is disconnected from AC power. In one embodiment, this occurs when the platform is in a reduced power state, e.g. standby, connected standby, hibernate, or OFF mode. In one embodiment, all platform states may be considered as applicable for reduced power consumption mode (e.g., even ON and connected to AC power).

At block 2330, the system determines the protection mode of the platform. As noted above, the modes are: unarmed, armed, arming-in-process, and suspecting.

At block 2340, the process identifies the authorized interfaces that may be used with the platform. The interfaces may include one or more of: an NFC reader, a Bluetooth pairing, a video camera, a biometric reader, a microphone, and others. Each of these interfaces may be located on the OEM Board or implemented as a peripheral.

At block 2350, the process determines whether any interfaces are relevant to the current mode. The current mode shows which, if any, actions may be received via an interface. FIG. 24 shows an exemplary list of modes and associated types of input that would be recognized. One or more interface types may be associated with each of these types of input.

If no interfaces are relevant, the process at block 2360 removes power from all interfaces. If some interfaces are relevant, only those selected interfaces are powered, at block 2370. This reduces the overall power consumption by the platform. Since these interfaces are powered even in low power consumption states, reducing the power consumption is useful.

The process then continues to block 2380.

At block 2380, the process determines whether the lowered consumption requirement has ended. In one embodiment, the lowered consumption requirement may end when the system is placed in the ON state and/or when the platform is plugged into an AC outlet or docked, thus removing the need to conserve power. In one embodiment, the lowered consumption requirement may be considered applicable for all platform power states. If the lowered power consumption need is ended, the process ends at block 2385. The process would restart again, at block 2310, when the system once again would need to reduce its power consumption.

If the lowered consumption need is not ended, the process at block 2390 determines whether the mode of the mechanism has changed. The mode of the mechanism may change due to user input, idle time, or other settings. If the mode has not changed, the process returns to block 2380, to continue monitoring whether the lowered consumption need has ended. If there is a change in the mode, the process continues to block 2330 to determine the mode, and adjust settings as needed.

In this way, the system enables the use of the interfaces regardless of mode, while reducing power consumption when possible.

Figure 25:
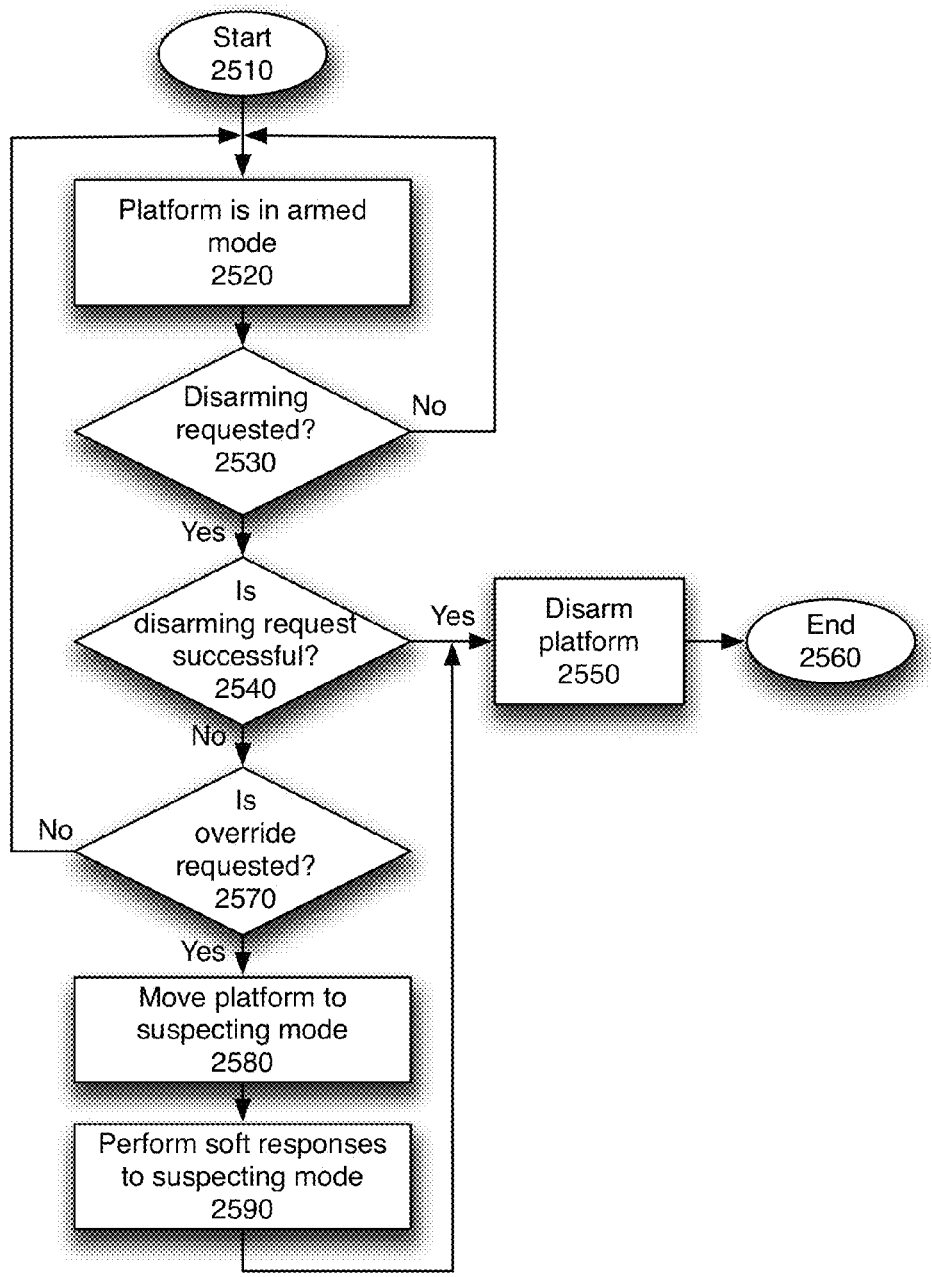
FIG. 25 is a flowchart of one embodiment of a protective override mechanism.

FIG. 25 is a flowchart of one embodiment of a protective override mechanism. An override may be invoked to the anti-theft mechanism due to various reasons. Reasons may include: The end-user left his disarming device (e.g., phone or badge) elsewhere, the disarming device malfunctioned or lost power, the platform is being returned from the end-user to IT and repurposed to another end-user, the platform is being recalled from the end-user to the OEM, and other reasons. The process starts at block 2510.

At block 2520, the platform is in an armed mode. In the armed mode, disarming is required to access the data on the platform. In one embodiment, the platform may have entered the armed mode automatically or due to user action.

At block 2530, the process determines whether a disarming is requested. If no disarming is requested, the process continues to block 2520 to maintain the platform in the armed mode.

If disarming is requested, the process continues to block 2540. At block 2540, the process determines whether the disarming request is successful. If so, at block 2550 the platform is disarmed. The process then ends at block 2560. A subsequent override request in this mode will be immediately granted.

If the disarming request is not successful, the process continues to block 2570. In one embodiment, this occurs only after a set number of failed attempts.

At block 2570, the process determines whether override has been requested. If no override is requested, the process returns to block 2520, and the platform remains in the armed mode.

If the override is requested, the process, at block 2580 moves the platform to the suspecting mode. In the suspecting mode, at block 2590 the soft responses to the suspecting mode are performed. Soft responses are defined as reactions that are not hard to reverse in order to regain platform functionality. Examples of soft reactions include transmission of an alert, transition to a different power state in order to protect data (under the assumption that the end-user knows the data protection password).

After all soft responses have been performed, in the suspecting mode, the process continues to block 2550, and transitions to the unarmed mode. In one embodiment, in the unarmed mode the platform is usable. However, the system does not decrypt the data on the platform. Thus, while the platform is not "unusable" the data remains protected. The process then ends.

FIG. 26 compares between various options of override scenarios. The option described above is the last one, in which the thief cannot steal data and asset, but the owner will not end up with an unusable system when an override is requested. In this way, the data remains protected and a theft suspicion alert is sent in order to protect against possible theft in case the thief attempted to invoke the override. However, the platform remains accessible, in case it was the end-user who invoked the override.

Figure 27A:
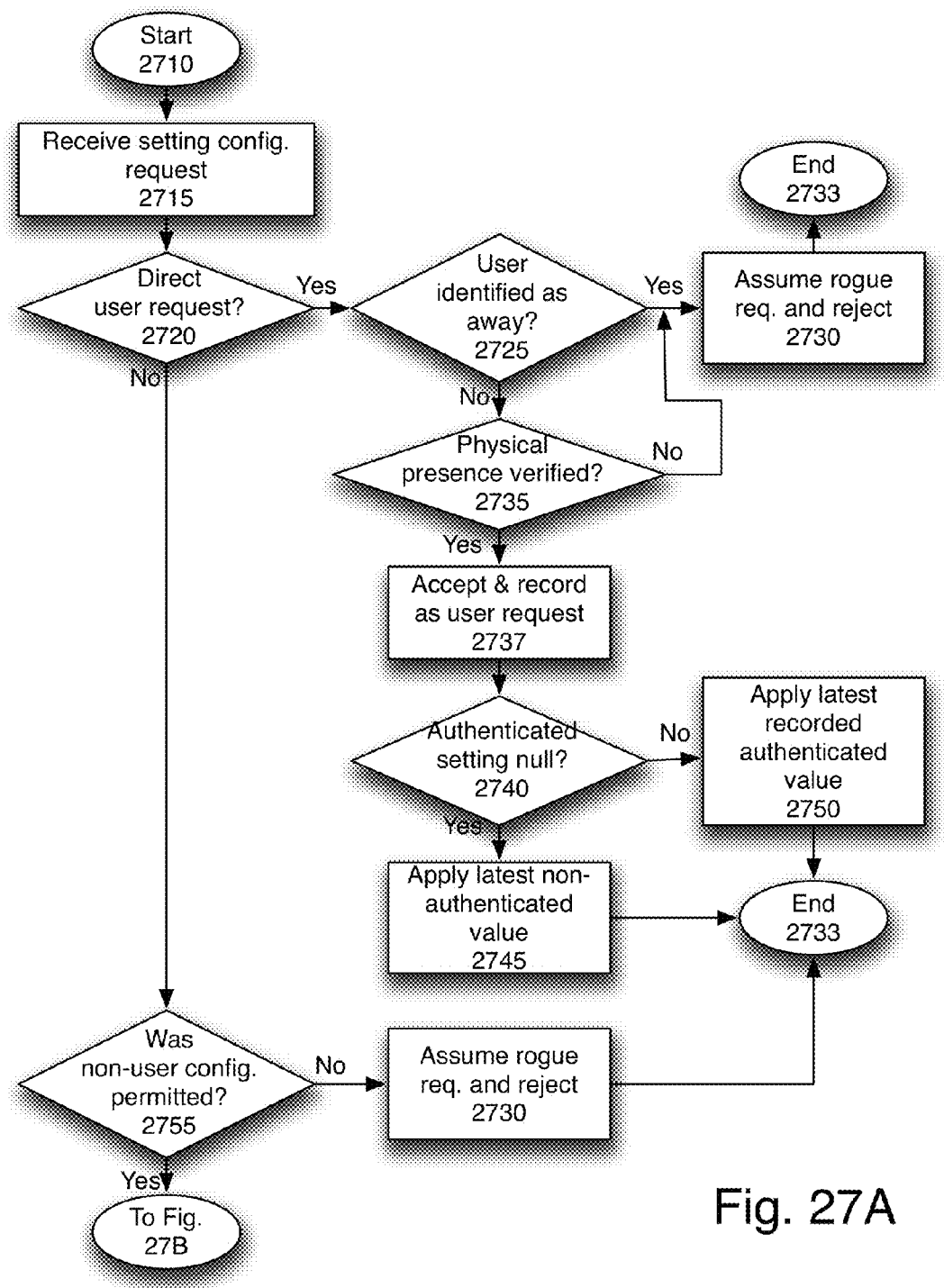
FIGS. 27A and 27B are a flowchart of one embodiment of corporate provisioning of a platform and its co-existence with user configuration.
Figure 27B:
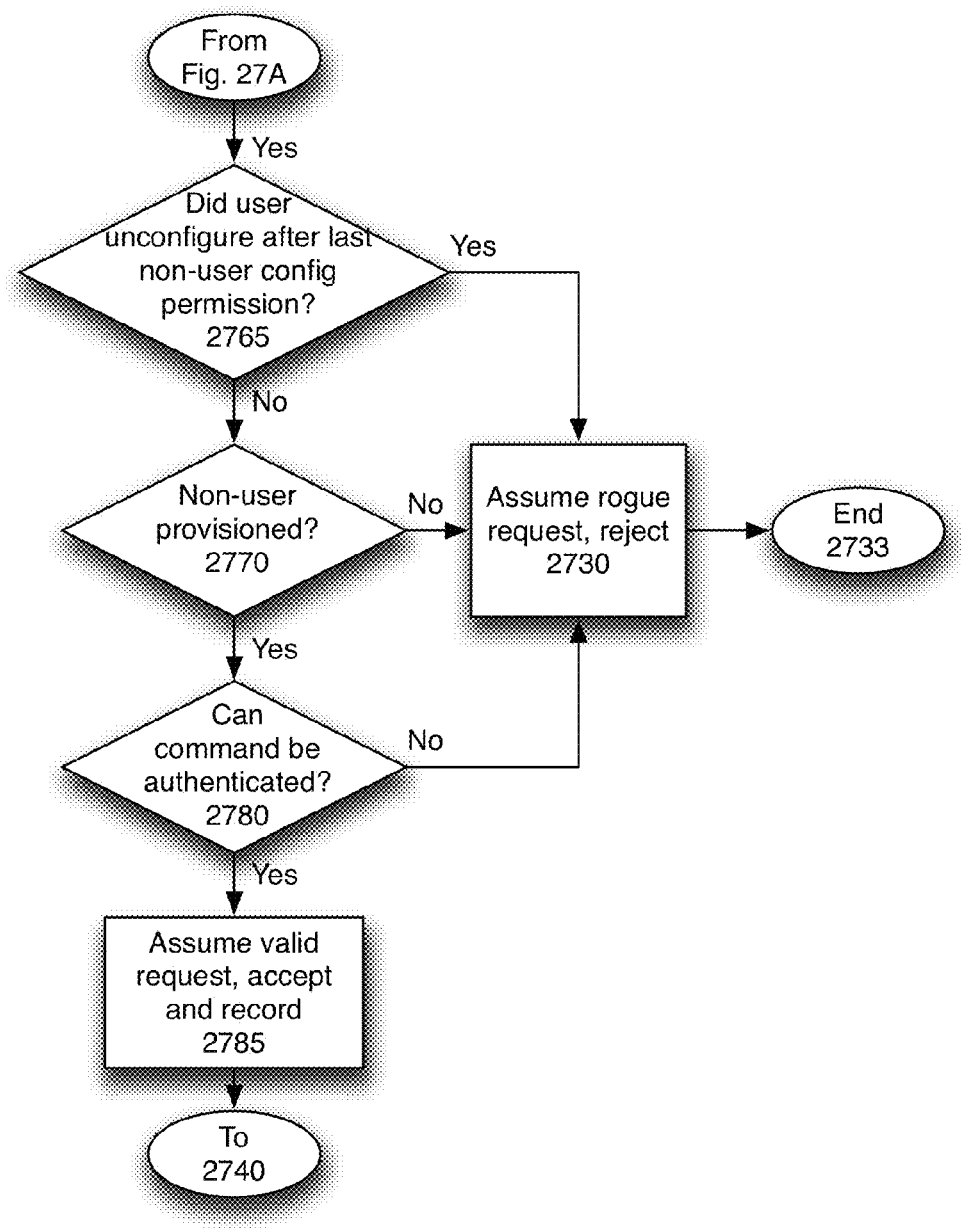

FIGS. 27A and 27B are a flowchart of one embodiment of corporate provisioning of a platform. The process starts at block 2710. At block 2715, a configuration alteration request is received. The configuration alteration may change alerting mechanisms, pair a device with the platform, remove a device from pairing, change timing of alerts, add or remove a kill pill, or perform other alterations to the system.

At block 2720, the process determines whether the request is a direct user request. If so, at block 2725, the process determines whether the user has been identified as being away from the platform. As noted above, the user's proximity to the platform may be monitored based on a paired device, or an arming mode of the device.

If the user is identified as away, the process, at bock 2730 rejects the request, assuming it is a rogue request. In one embodiment, the system may further send an alert if a request is identified as a rogue request. The process then ends at block 2733.

If the user had not been identified as away at block 2725, the process continued to block 2735. At block 2735, the process verifies the physical presence of the user, to verify that the configuration was performed by a physical user operating the configuration software, as opposed to by malicious software. In one embodiment, this can be verified by aggregating the user's requests for policy changes and then displaying them on some part of the screen which is not readable to software (e.g., "sprite" screen), but which the user can see. In one embodiment, this is accomplished by providing the anti-theft mechanism direct side-band access to the graphics controller. This part of the screen would also contain some means of confirmation. For example, it may display a confirmation code which only the user can see, or request an action from the user. The user would then type in the code, perform the requested action, or otherwise attest that the configuration request was made by an actual user. If attestation of physical user presence is not properly received, the process continues to block 2730 to reject the request as a rogue request. Otherwise, the process continues to block 2737.

At block 2737, the request is accepted and recorded.

At block 2740, the process determines whether the prior authenticated setting for this configuration element was "null" (e.g. blank). If so, the latest value entered by the user is applied as the mechanism's active policy in block 2745. In any case, the value entered by the user is recorded as the user's desired policy. The process then ends at block 2733. If the configuration element was not null prior to the user's entry, the latest recorded and authenticated value is applied as the mechanism's active policy, at block 2750. The process then ends at block 2733.

If, at block 2720, the process found that the request was not a direct user request (e.g., arrived through an interface which does not require or permit attestation of configuration by a physical user), the process continued to block 2755. At block 2755, the process determines whether non-user configuration is permitted. In one embodiment, the user may have administrator configuration capability disabled. In one embodiment, for a corporate-owned platform, the user may not have the ability to disarm the administrator configuration.

If non-user configuration is not permitted, at block 2730, the system assumes it is a rogue request, and the process ends.

If non-user configuration was ever permitted, the process continues to block 2765. At block 2765, the process determines whether after the last time that the user allowed non-user configuration by policy, the user has reset settings to default, such that the policy of not allowing non-user configuration also reverted to a default. If so, the process continues to block 2730, assuming this is a rogue request and discarding it. In one embodiment, the user may validate a non-user configuration request. In one embodiment, the user may be informed about a non-user configuration request. In one embodiment, the system does not discard such rogue requests but rather saves them, and enables the user to validate them, or be informed about them. This enables an administrator to make changes, even if a prior change was overridden by the user.

If the mode of the system is such that the user allowed for non-user configuration requests and did not revert that policy to default afterward, the process continues to block 2770.

At block 2770, the process determines whether the non-user has been provisioned. Provisioning a non-user provides authorization to a particular non-user to make changes. If the non-user has not been provisioned, at block 2730 the system assumes the request is a rogue request and discards it. If the user has been provisioned, the process, at block 2780 determines whether the command can be authenticated. Authentication, in one embodiment, includes validating the administrator as the provisioned-non-user. If the command cannot be authenticated, at block 2730 the process assumes the request is rogue and discards it.

If the command can be authenticated, at block 2785 the process assumes the request is valid, accepts and records it. The process then continues to block 2740, to determine whether to apply this non-user setting (in case it's not null), or to apply the latest recorded user setting (in case the now recorded non-user setting is null). The process described herein is for a system in which the user has the primary control over the configuration of the platform. That may not be the case in all situations.

Figure 28:
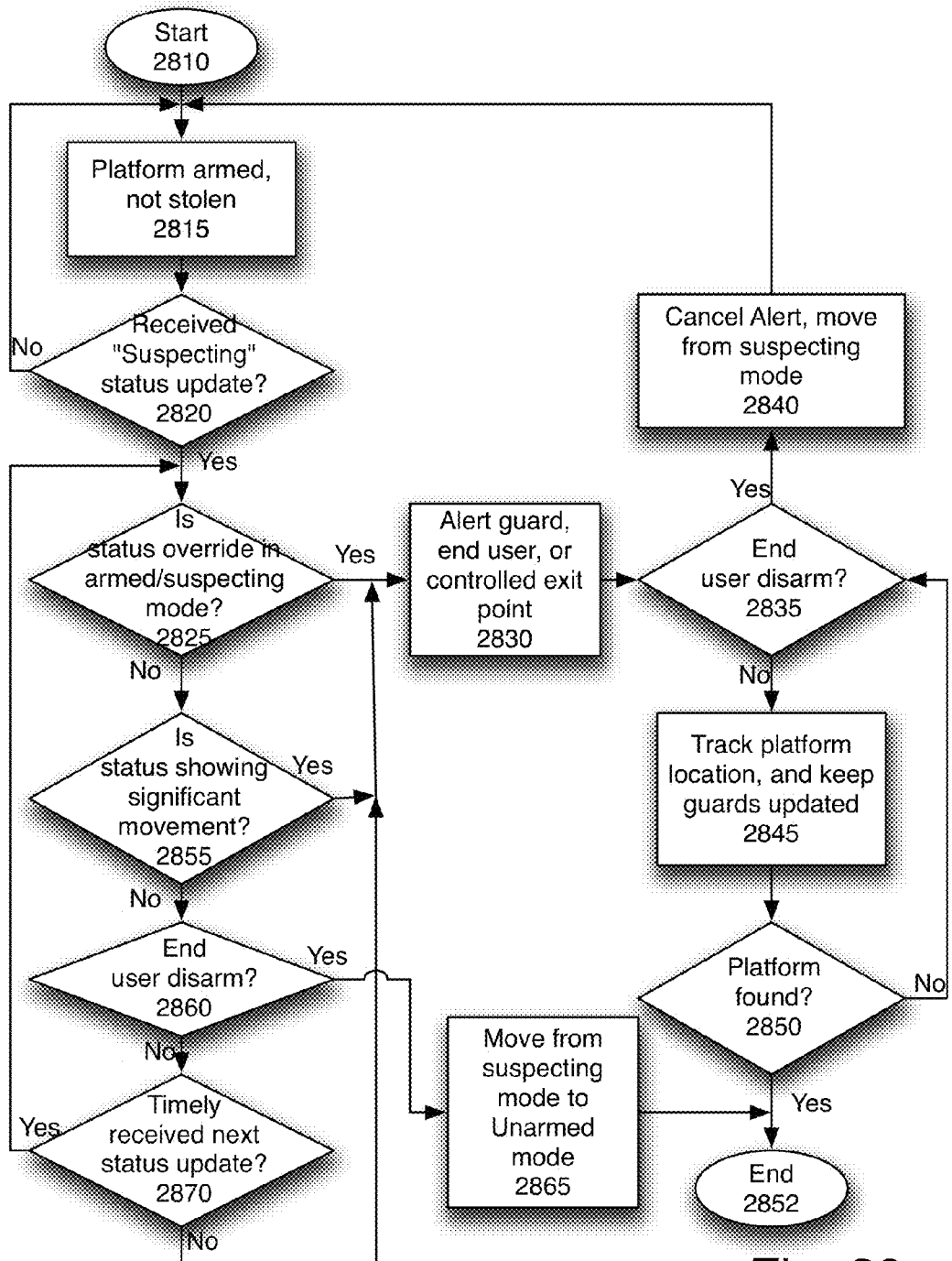
FIG. 28 is a flowchart of one embodiment of platform security in a monitored environment.

FIG. 28 is a flowchart of one embodiment of platform security in a monitored environment. A monitored environment is one in which there are controlled exit points. A controlled exit point may be an exit point that can be locked remotely, an exit point with one or more guards, or an exit point which can be otherwise made inaccessible. The process starts at block 2810. In one embodiment, the process starts when a platform is being used in the monitored environment. The flowchart is from the perspective of a security server, which receives information from the platform, and sends information to the controlled access points. In one embodiment, the system may be configured to enable a platform to directly send control signals to the controlled exit points.

At block 2815, the security server receives a notification that the platform is armed. The server assumes that the platform is not stolen.

At block 2820, the process determines whether a "suspecting" status update has been received from the platform. If no such mode has been received, the process returns to block 2815, to continue monitoring the armed platform. In one embodiment, when the platform is disarmed, the security server's monitoring is turned off. In one embodiment, the platform sends a notification that it has been disarmed, which ends monitoring.

If a "suspecting" status update is received from the platform, at block 2820, the process continues to block 2825. At block 2825, the process determines whether the suspecting mode was entered because of an attempt to override the disarming in the armed or suspecting modes. If so, at block 2830 the system alerts the controlled exit point. This may include alerting a guard, locking a gate, sounding an audio alarm at the exit point or throughout the building, or other actions. In one embodiment, some of these actions may take place with a time delay. For example, before alerting guards, the system may provide sufficient time for a user to disarm his platform, in case this was a false positive. In one embodiment, in order to further reduce false positives, the platform may locally provide an indicator to the user, so that he is aware that the platform is in suspecting mode and that further significant movement with it will cause the guards to be alerted. This indicator may be a visual indicator, an audio indicator, or another type of indicator.

At block 2835, the process determines whether the user has disarmed the platform, indicating that the authorized user has indicated that he or she has the platform, and there is no theft in progress. If the end user has successfully disarmed the platform, at block 2840 the alert is canceled. The process then returns to block 2815, with the platform armed and indicated as not stolen. In one embodiment, the platform may enter a disarmed mode and terminate this monitoring loop.

If no authorized user disarming was received, at block 2835, the server continues to track platform location and keep the alert. In one embodiment, the platform may be able to receive motion data, based on one or more of wireless access point data, accelerometer data, GPS data, or other motion or location based information. The server may use this information to track the platform.

At block 2850, the process determines whether the platform has been found. If so, the process ends at block 2852. Otherwise, the process returns to block 2835, to continue monitoring for user disarm or having the platform found. In this way, the system tracks the platform, and ensures that a thief cannot take the platform from the monitored environment.

Alternative to status override, the system may enter the alert mode when significant movement is detected while the platform is armed (block 2855), or when the platform fails to send a status update in the suspecting mode (2870). In each of these scenarios, and other scenarios not shown in which a security server may consider the platform stolen, the process continues to block 2830, and the controlled exit points are alerted by the security server, to attempt to thwart a thief. If no such alert is needed, the process returns to block 2825 to continue monitoring. While monitoring for alert mode entry in block 2825, 2855, and 2870, the system can be disarmed by a user, at block 2860. If the system is disarmed, the system moves from the suspecting mode to Unarmed mode, at block 2865, and the process ends at block 2852.

Figure 29:
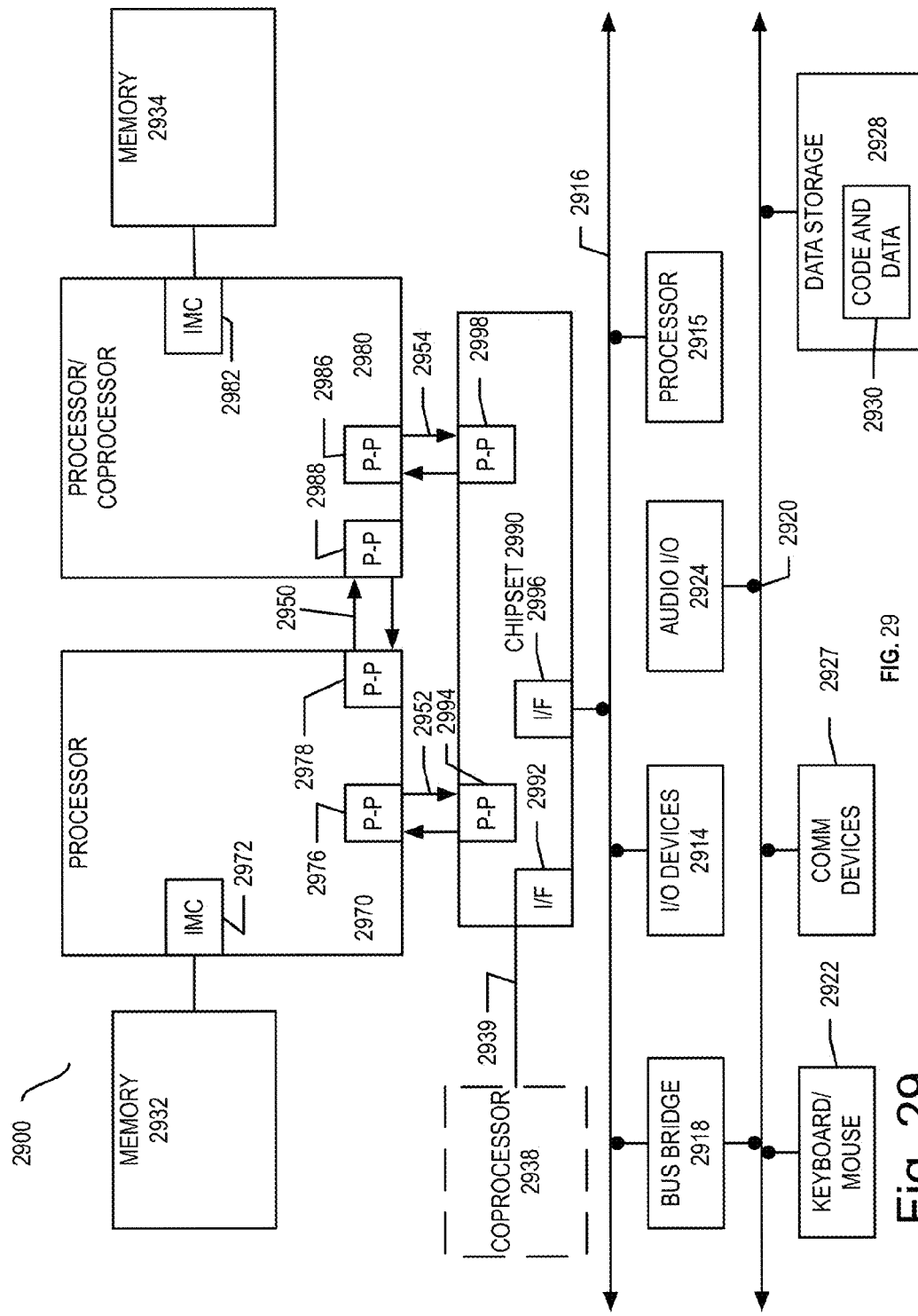
FIG. 29 is a block diagram of one embodiment of a computer system that may be used as the platform, and/or the paired device.

FIG. 29 is a block diagram of an exemplary system 2900 in accordance with an embodiment of the present invention. The system 2900 may be coupled to the OEM board, described above, which implements the always-available anti-theft system described herein. As shown in FIG. 29, multiprocessor system 2900 is a point-to-point interconnect system, and includes a first processor 2970 and a second processor 2980 coupled via a point-to-point interconnect 2950.

Processors 2970 and 2980 are shown including integrated memory controller (IMC) units 2972 and 2982, respectively. Processor 2970 also includes as part of its bus controller units point-to-point (P-P) interfaces 2976 and 2978; similarly, second processor 2980 includes P-P interfaces 2986 and 2988. Processors 2970, 2980 may exchange information via a point-to-point (P-P) interface 2950 using P-P interface circuits 2978, 2988. As shown in FIG. 29, IMCs 2972 and 2982 couple the processors to respective memories, namely a memory 2932 and a memory 2934, which may be portions of main memory locally attached to the respective processors.

Processors 2970, 2980 may each exchange information with a chipset 2990 via individual P-P interfaces 2952, 2954 using point to point interface circuits 2976, 2994, 2986, 2998. Chipset 2990 may optionally exchange information with the coprocessor 2938 via a high-performance interface 2939. In one embodiment, the coprocessor 2938 is a special-purpose processor, such as, for example, a high-throughput MIC processor, a network or communication processor, compression engine, graphics processor, GPGPU, embedded processor, or the like. In one embodiment, chipset 2990 may implement the OEM board providing the always-available security system. In one embodiment, the chipset 2990 may be separately powered, as described above.

A shared cache (not shown) may be included in either processor or outside of both processors, yet connected with the processors via P-P interconnect, such that either or both processors' local cache information may be stored in the shared cache if a processor is placed into a low power mode.

Chipset 2990 may be coupled to a first bus 2916 via an interface 2996. In one embodiment, first bus 2916 may be a Peripheral Component Interconnect (PCI) bus, or a bus such as a PCI Express bus or another third generation I/O interconnect bus, although the scope of the present invention is not so limited.

As shown in FIG. 29, various I/O devices 2914 may be coupled to first bus 2916, along with a bus bridge 2918, which couples first bus 2916 to a second bus 2920. In one embodiment, one or more additional processor(s) 2915, such as coprocessors, high-throughput MIC processors, GPGPU's, accelerators (such as, e.g., graphics accelerators or digital signal processing (DSP) units), field programmable gate arrays, or any other processor, are coupled to first bus 2916. In one embodiment, second bus 2920 may be a low pin count (LPC) bus. Various devices may be coupled to a second bus 2920 including, for example, a keyboard and/or mouse 2922, communication devices 2927 and a storage unit 2928 such as a disk drive or other mass storage device which may include instructions/code and data 2930, in one embodiment. Further, an audio I/O 2924 may be coupled to the second bus 2920. Note that other architectures are possible. For example, instead of the point-to-point architecture of FIG. 29, a system may implement a multi-drop bus or other such architecture. In one embodiment, the OEM board implementing the always-available anti-theft system (not shown) may be coupled to bus 2916 or second bus 2920.

Figure 30:
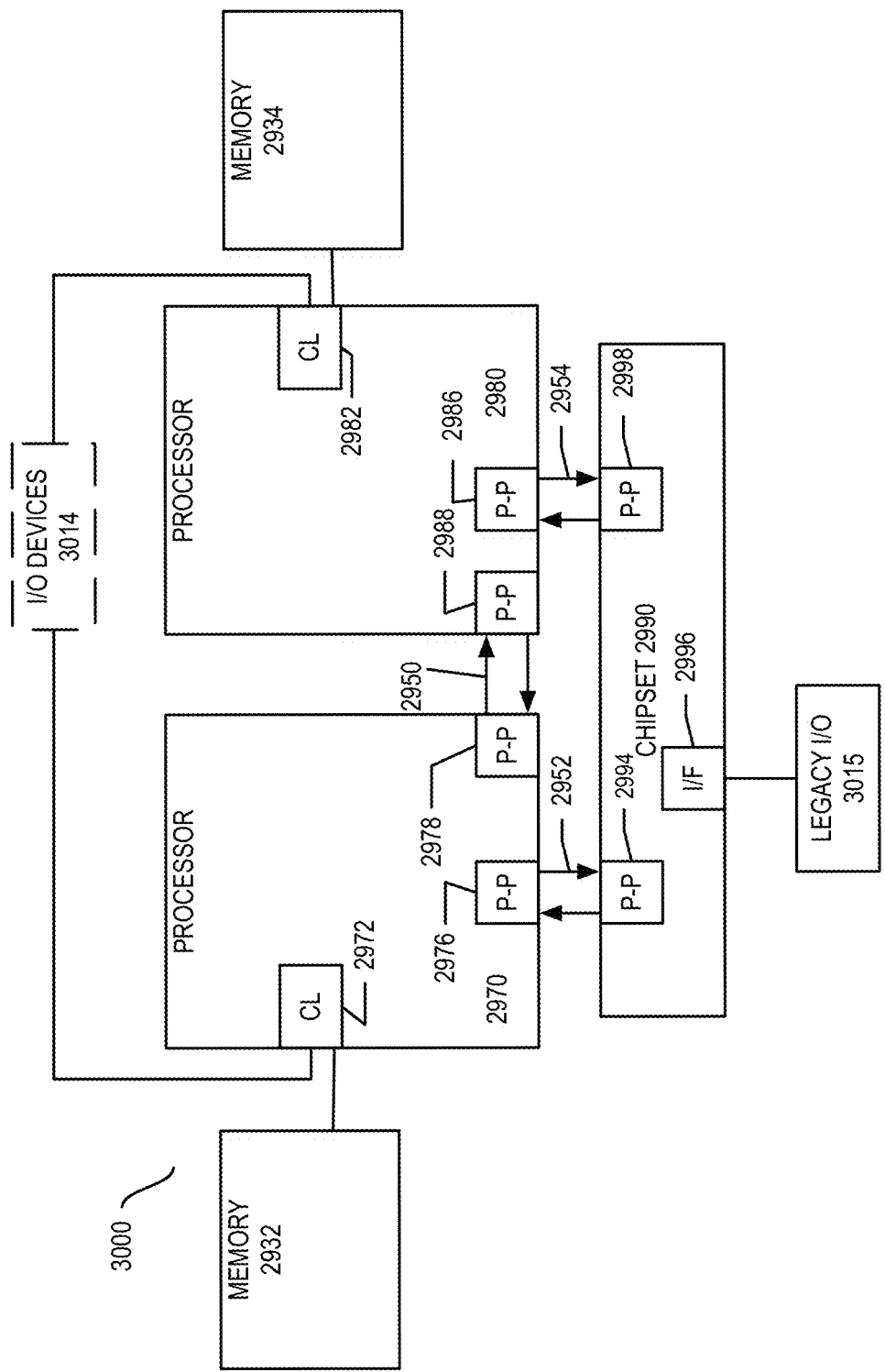
FIG. 30 is a block diagram of a second more specific exemplary system in accordance with an embodiment.

Referring now to FIG. 30, shown is a block diagram of a second more specific exemplary system 3000 in accordance with an embodiment of the present invention. Like elements in FIGS. 29 and 30 bear like reference numerals, and certain aspects of FIG. 29 have been omitted from FIG. 30 in order to avoid obscuring other aspects of FIG. 30.

FIG. 30 illustrates that the processors 2970, 2980 may include integrated memory and I/O control logic ("CL") 2972 and 2982, respectively. Thus, the CL 2972, 2982 include integrated memory controller units and include I/O control logic. FIG. 30 illustrates that not only are the memories 2932, 2934 coupled to the CL 2972, 2982, but also that I/O devices 3014 are also coupled to the control logic 2972, 2982. Legacy I/O devices 3015 are coupled to the chipset 2990.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising:
    an arming mechanism to automatically arm the system in response to an automatic arming policy, the automatic arming policy being selected from among multiple arming policies, including location, time of day, disconnection from a network, loss of Bluetooth proximity, loss of user via camera, closing of the lid, device idleness, and a timer;
    a risk behavior logic to detect a potential problem by analyzing interface data received from interfaces;
    a core logic component to analyze the potential problem and to trigger a security action logic to perform a security action when the system is armed and the potential problem indicates a theft suspicion;
    the security action logic to utilize one of a self-kill pill and a remote kill pill to disable the system by deleting data, wherein the security action logic to send a notification of the theft suspicion to an owner of the system and to an external security service and to:
        initialize a self-kill pill when no response to the notification is received within a specified period of time;
        initialize a remote kill pill received from the external security service; and
        resume normal functionality when a response is received from the owner.

2. The system of claim 1, further comprising:
    a disarming logic to disarm the system, upon receiving a disarming command indicating that there was no theft.

3. The system of claim 1, wherein the core logic and the security action logic to operate in low power states.

4. The system of claim 1, wherein the automatic arming policy comprises at least one of loss of Bluetooth proximity, loss of user via camera, closing of the lid, device movement, device idleness, location, and time of day.

5. The system of claim 1, wherein the automatic arming policy comprises at least one of loss of Bluetooth proximity, loss of user via camera, closing of the lid, device movement, device idleness, location, and time of day.

6. The system of claim 1, further comprising an automatic disarming mechanism to automatically disarm the system in response to an automatic disarming policy.

7. The system of claim 6, wherein the automatic disarming policy comprises at least one of Bluetooth proximity detected, User ID via camera, presence of known network connection, private area communication detected, and geographic location.

8. The system of claim 1 wherein the interfaces comprise at least one of a Bluetooth sensor, a motion sensor, a GPS receiver, and manual arming mechanisms.

9. The system of claim 8, wherein the system further comprises a user-carried device and a platform.

10. The system of claim 9 wherein the interfaces comprise a user-carried device GPS receiver, a user-carried device motion sensor, and a user-carried device motion sensor, and a platform device GPS receiver, a platform motion sensor, and a platform motion sensor.

11. The system of claim 10, wherein the risk behavior logic to detect the potential problem if the user-carried device is in motion, the platform is in motion, and the user-carried device is not within a range of proximity of the platform.

12. A system comprising:
    an arming mechanism to automatically arm the system in response to an automatic arming policy, the automatic arming policy being selected from among multiple arming policies, including location, time of day, disconnection from a network, loss of Bluetooth proximity, loss of user via camera, closing of the lid, device idleness, and a timer;
    a risk behavior logic to detect a potential problem by analyzing interface data received from interfaces;
    a core logic component to analyze the potential problem and to trigger a security action logic to perform a security action when the potential problem indicates a theft suspicion and the system is armed;
    storage to store a self-kill pill which when executed is to disable the system; and
    security action logic to utilize one of the self-kill pill and a remote kill pill to disable the system by deleting data, wherein the security action logic to send a notification of the theft suspicion to an owner of the system and to an external security service and to:
        initialize a self-kill pill when no response to the notification is received within a specified period of time;
        initialize a remote kill pill received from the external security service; and
    resume normal functionality when a response is received from the owner.

13. The system of claim 12, further comprising:
a disarming logic to disarm the system, upon receiving a disarming command indicating that there was no theft, the disarming logic, when received in time, to stop the kill pill.

14. The system of claim 12, wherein the core logic and the security action logic operate in low power states.

15. A method comprising:
automatically arming the system in response to an automatic arming policy, the automatic arming policy being selected from among multiple arming policies, including location, time of day, disconnection from a network, loss of Bluetooth proximity, loss of user via camera, closing of the lid, device idleness, and a timer;
detecting a potential problem by analyzing interface data received from interfaces;
determining that the potential problem is an indication of a theft; and
triggering a security action, in response to the indication of a theft and the system being armed, the security action including sending a notification of the theft suspicion to an owner of the system and to an external security service and executing a kill pill to disable the system by deleting data, wherein a self-kill pill is executed when no response to the notification is received within a specified period of time, and a remote kill pill is executed when received from the external security service is executed.

16. The method of claim 15, wherein the automatic arming policy comprises at least one of loss of Bluetooth proximity, loss of user via camera, closing of the lid, device movement, device idleness, location, and time of day.

17. The method of claim 15, further comprising an automatic disarming mechanism to automatically disarm the system in response to an automatic disarming policy.

18. The method of claim 17, wherein the automatic disarming policy comprises at least one of Bluetooth proximity detected, User ID via camera, presence of known network connection, private area communication detected, and geographic location.

19. The method of claim 15 wherein the interfaces comprise at least one of a Bluetooth sensor, a motion sensor, and a GPS receiver.

20. The method of claim 19, wherein the system further comprises a user-carried device and a platform.

* * * * *